US012005524B2

(12) United States Patent
Mikkelsen et al.

(10) Patent No.: US 12,005,524 B2
(45) Date of Patent: Jun. 11, 2024

(54) CUTTING MACHINERY LASER SYSTEM

(71) Applicant: GERBER TECHNOLOGY LLC, Tolland, CT (US)

(72) Inventors: Nikolai Mikkelsen, Milwaukee, WI (US); Steen Mikkelsen, Milwaukee, WI (US)

(73) Assignee: GERBER TECHNOLOGY LLC, Tolland, CT (US)

( * ) Notice: Subject to any disclaimer, the term of this patent is extended or adjusted under 35 U.S.C. 154(b) by 145 days.

(21) Appl. No.: 16/146,976

(22) Filed: Sep. 28, 2018

(65) Prior Publication Data

US 2019/0105737 A1 Apr. 11, 2019
US 2023/0271275 A9 Aug. 31, 2023

Related U.S. Application Data

(63) Continuation-in-part of application No. 15/249,134, filed on Aug. 26, 2016, now Pat. No. 11,173,572, (Continued)

(51) Int. Cl.
*B23K 26/38* (2014.01)
*B23K 26/03* (2006.01)
(Continued)

(52) U.S. Cl.
CPC ............ *B23K 26/38* (2013.01); *B23K 26/032* (2013.01); *B23K 26/0838* (2013.01); *B23K 26/0869* (2013.01); *B23K 26/402* (2013.01); *B23K 37/0211* (2013.01); *B23K 37/0235* (2013.01); *B23K 37/0408* (2013.01); *B23K 37/0461* (2013.01); *B23K 2101/18* (2018.08); (Continued)

(58) Field of Classification Search
CPC ..... B23K 26/00; B23K 26/0876; B23K 26/38
USPC .......................... 219/121.67, 121.39, 121.54
See application file for complete search history.

(56) References Cited

U.S. PATENT DOCUMENTS 3,772,949 A 11/1973 Anders et al.
4,301,999 A * 11/1981 Higgins ................. B26D 7/018
269/21

(Continued)

FOREIGN PATENT DOCUMENTS

CN 201064790 A 5/2008
CN 103359448 A 10/2013
(Continued)

OTHER PUBLICATIONS

International Search Report and Written Opinion for PCT/US2015/017704; date of mailing Jul. 27, 2015; 11 pages.
(Continued)

*Primary Examiner* — Nathaniel E Wiehe
*Assistant Examiner* — Thomas J Ward
(74) *Attorney, Agent, or Firm* — Day Pitney LLP; George Chaclas

(57) ABSTRACT

A cutting apparatus comprising a cutting table and a first cutting material belt movably supported about the cutting table about a first roller and a second roller. A second cutting material belt is removably supported above the first cutting material belt about the first roller and a third roller, wherein the second roller is intermediate the first roller and the second roller.

20 Claims, 22 Drawing Sheets

Related U.S. Application Data which is a continuation-in-part of application No. PCT/US2015/017704, filed on Feb. 26, 2015.

(60) Provisional application No. 62/568,654, filed on Oct. 5, 2017, provisional application No. 62/249,322, filed on Nov. 1, 2015, provisional application No. 62/064,841, filed on Oct. 16, 2014, provisional application No. 61/945,031, filed on Feb. 26, 2014.

(51) Int. Cl.

| | | |
|---|---|---|
| *B23K 26/08* | (2014.01) | |
| *B23K 26/402* | (2014.01) | |
| *B23K 37/02* | (2006.01) | |
| *B23K 37/04* | (2006.01) | |
| *B23K 101/18* | (2006.01) | |
| *B23K 103/00* | (2006.01) | |
| *B23K 103/10* | (2006.01) | |
| *B23K 103/16* | (2006.01) | |

(52) U.S. Cl.
CPC .... *B23K 2103/10* (2018.08); *B23K 2103/172* (2018.08); *B23K 2103/38* (2018.08); *B23K 2103/40* (2018.08); *B23K 2103/42* (2018.08)

(56) References Cited

U.S. PATENT DOCUMENTS

| | | |
|---|---|---|
| 4,646,911 A | 3/1987 | Pearl et al. |
| 4,672,172 A | 6/1987 | Pearl |
| 5,141,212 A | 8/1992 | Beeding |
| 5,262,612 A | 11/1993 | Momany et al. |
| 5,304,773 A | 4/1994 | Kilian et al. |
| 5,632,915 A | 5/1997 | Schnetzer et al. |
| 9,586,289 B2 * | 3/2017 | Penn .................. C23C 4/12 |
| 2004/0153283 A1 | 8/2004 | Wargon |
| 2006/0130435 A1 | 6/2006 | Hada et al. |
| 2008/0263841 A1 | 10/2008 | Stelzl |
| 2009/0308851 A1 * | 12/2009 | Harnisch ............ B23K 26/06 |
| | | 219/121.67 |
| 2011/0253685 A1 | 10/2011 | Hsu et al. |
| 2013/0036887 A1 | 2/2013 | Moore et al. |
| 2013/0319983 A1 | 12/2013 | Bruijne et al. |
| 2015/0033921 A1 * | 2/2015 | Finnsson ............ B65G 15/28 |
| | | 83/73 |
| 2016/0325395 A1 | 11/2016 | Von Schumann |
| 2017/0106475 A1 | 4/2017 | Mikkelsen et al. |

FOREIGN PATENT DOCUMENTS

| | | | |
|---|---|---|---|
| FR | 1069309 A | 7/1954 | |
| GB | 2522884 A | 8/2015 | |
| JP | H09142624 Y | 6/1997 | |
| WO | 2015130912 A1 | 9/2015 | |
| WO | WO2015130912 * | 9/2015 | ............. B23K 26/00 |

OTHER PUBLICATIONS

International Search Report and Written Opinion for PCT/US2018/053549; mail date Dec. 4, 2018; 9 pages.

First Office Action issued in corresponding Chinese patent application No. 201880065525.X, mailed Aug. 4, 2021, 18 pages (with English translation).

Supplementary European Search Report issued in corresponding European patent application No. 18864599.8, mailed Sep. 7, 2021, 9 pages.

* cited by examiner

CUTTING MACHINERY LASER SYSTEM

CROSS REFERENCE TO RELATED APPLICATIONS

This application claims the benefit of U.S. Provisional Application Ser. No. 62/568,654 filed on Oct. 5, 2017 entitled Cutting Machinery Laser System incorporated herein by reference in its entirety, and is a Continuation in Part of U.S. application Ser. No. 15/249,134, filed Aug. 26, 2016, now issued as U.S. Pat. No. 11,173,572, which claims the benefit of U.S. Provisional Application Ser. No. 62/249,322, filed Nov. 1, 2015 and is a Continuation in Part of U.S. International Patent Application No. PCT/US2015/017704, filed Feb. 26, 2015, which claims the benefit of U.S. Provisional Patent Application Ser. Nos. 62/064,841 and 61/945,031, the entirety of each are incorporated herein by reference for any purpose whatsoever.

BACKGROUND OF THE INVENTION

The present application relates generally to the field of cutting a sheet or roll with a blade and cutting a sheet with a laser.

SUMMARY

In one embodiment a cutting apparatus comprises a cutting table and a laser belt movably supported about the cutting table about a first roller and a second roller. A horizontal rail extends across the cutting table. A laser assembly includes a first portion having a laser tube operatively secured to the horizontal rail and a second portion operatively secured to the first portion, the second portion including a laser beam bender assembly.

In one embodiment a cutting apparatus comprises a cutting table and a laser belt movably supported about the cutting table about a first roller and a second roller, the laser belt movable along a direction of travel extending perpendicular to the first roller and the second roller. A horizontal rail extends across the cutting table substantially between and parallel to a longitudinal axis of the first roller and second roller. A laser assembly includes a first portion having a laser tube operatively secured to the horizontal rail and a second portion operatively secured to the first portion, the second portion including a laser beam bender assembly. The first portion of the laser assembly includes a housing having a longitudinal axis parallel to the direction of travel of the laser belt.

In one embodiment a cutting apparatus comprises a cutting table and a laser belt movably supported about the cutting table about a first roller and a second roller, the laser belt movable along a direction of travel extending perpendicular to the first roller and the second roller. A horizontal rail extends across the cutting table substantially between and parallel to a longitudinal axis of the first roller and second roller. A laser assembly includes a first portion having a laser tube operatively secured to the horizontal rail and a second portion operatively secured to the first portion, the second portion including a laser beam bender assembly. The bracket is movable along the horizontal rail. The bracket being removable from the horizontal rail while coupled to the at least the first portion of the laser assembly.

In one embodiment a cutting system includes a cutting table and a first cutting material belt movably supported about the cutting table. A second cutting material is removably supported above the first cutting material. The laser cutting material includes a metal material having a plurality of apertures extending therethrough.

In one embodiment a cutting apparatus comprises a cutting table and a first cutting material belt movably supported about the cutting table about a first roller and a second roller. A second cutting material belt is removably supported above the first cutting material belt about the first roller and a third roller, wherein the second roller is intermediate the first roller and the second roller. The second cutting material belt includes a metal material having a plurality of apertures extending therethrough.

In one embodiment a cutting apparatus comprises a cutting table and a first cutting material belt movably supported about the cutting table about a first roller and a second roller. A second cutting material belt is removably supported above the first cutting material belt about the first roller and a third roller, wherein the second roller is intermediate the first roller and the second roller. The second cutting material belt includes a metal material having a plurality of apertures extending therethrough. The cutting apparatus further includes a laser assembly including a first portion having a laser tube operatively secured to a horizontal rail and a second portion operatively secured to the first portion, the second portion including a laser beam bender assembly. The first portion of the laser assembly includes a housing having a longitudinal axis parallel to the direction of travel of the laser belt.

In one embodiment a cutting system includes a cutting table and a laser cutting material formed of a metal material having a plurality of apertures extending therein.

In one embodiment a laser cutting material includes a metal material operatively adhered to a carrier material, the metal material having a plurality of apertures formed therein and a plurality of disks being located directly below a respective aperture.

A process for forming a laser cutting material comprising securing an aluminum foil to a carrier material and creating apertures into the aluminum foil.

In one embodiment a cutting material includes a plurality of panels with each panel including a base layer and an aluminum layer secured to the base layer. Each panel being secured to an adjacent panel with a connector.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION OF PREFERRED EMBODIMENTS

Figure 1:
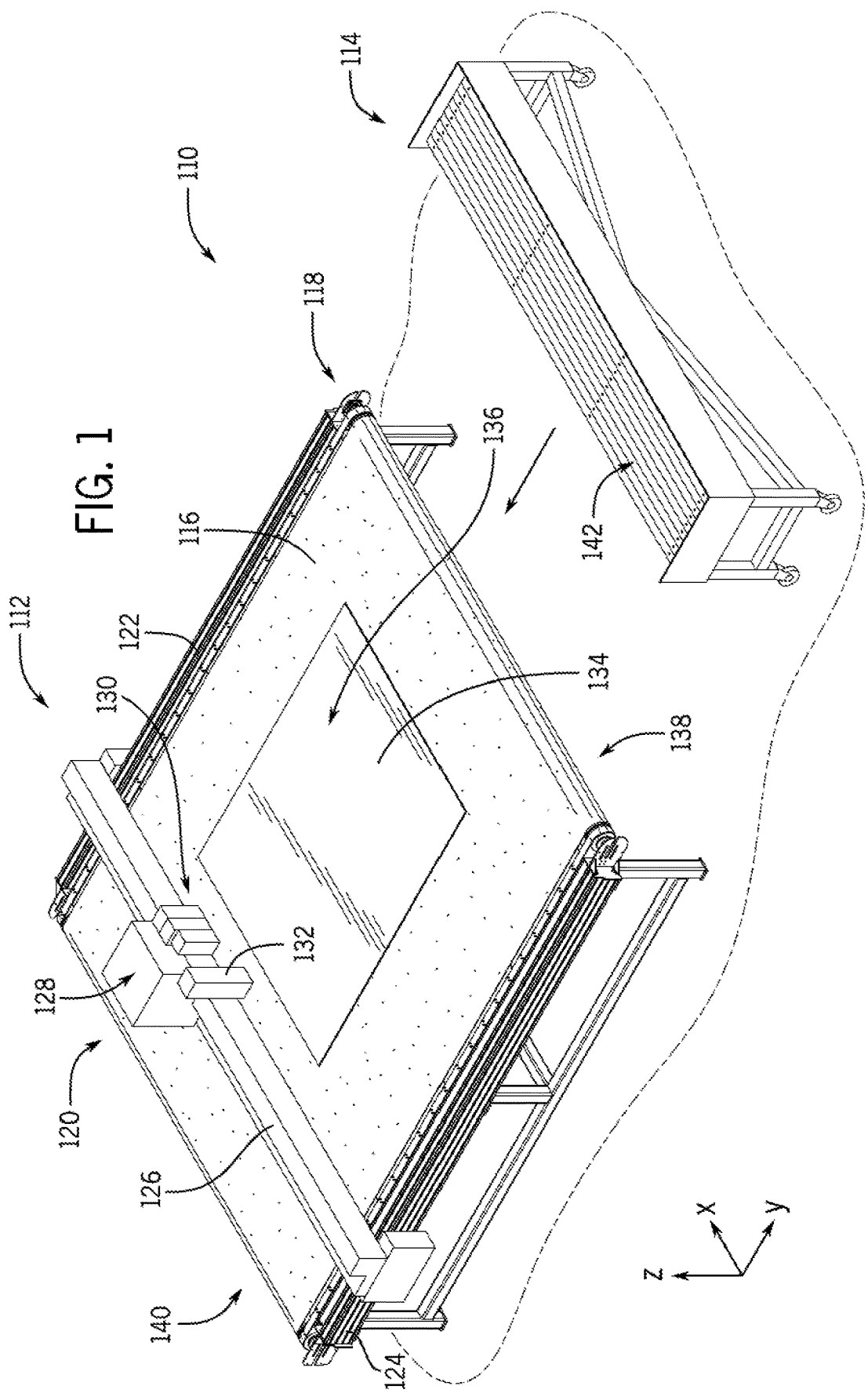
FIG. 1 is a top isometric view of a cutting system with a surface loader.

Referring to FIG. 1 a cutting system 110 includes a cutting table 112 and a cutting surface transfer station 114. Cutting table 112 includes a first cutting material 116 and a first conveyor system 118. Cutting table 112 further includes a cutter system 120 including a pair of side rails 122, 124 and a horizontal rail 126 supporting a cutter 128. Cutter 128 includes a cutting head 130 that may include one cutting tools such as a blade, a router, or other similar cutting tools known in the art. Cutting head 130 may also include a sensor 132 such as an optical detector including but not limited to a CCD camera known in the art to assist in locating a sheet 134 to be cut. In one embodiment a vacuum system is provided to draw air through the top surface of the first cutting material 116 into the table to assist in maintaining a sheet 134 positioned relative to a portion of the surface of the first cutting material 116, where sheet 134 is a sheet that will be cut by cutting head 130.

First cutting material 116 may be formed from a self-healing material such as felt with or without appropriate backing material. Other self-healing materials known in the art may also be used. First cutting material 116 in one embodiment extends over a top portion of cutting table 112 extending over a first or front roller, under a portion of the cutting table 112 and over a second rear roller. In this manner, cutting surface forms a continuous surface that may be moved about the table in a continuous manner. This continuous feature allows very long rolls or sheets longer than the cutting machine of materials 134 to be moved fore and aft relative to cutting table 112 and then moved from a front portion 138 toward a rear portion 140 and then off to a storing location that is off of cutting table 112 in a vector direction from front portion 138 toward rear portion 140. Cutting material 116 is moved along the y axis by a first and second roller positioned proximate the front 138 and rear 140 respectively of cutting table 112.

Cutting table 112 includes an aluminum honeycomb support surface with holes through which a vacuum system is acts. When the vacuum system is operating a vacuum is created within cutting table 112 that acts through the cutting material 116 upon the sheet material that is resting on an exposed surface of the cutting material to inhibit the sheet from moving relative to the cutting material 116. In a traditional setup cutting system includes a plurality of legs that rest upon a floor or support and act to maintain cutting table above the floor. The floor is positioned below the vacuum surface. The term "below" as used herein to describe a relative position such that below is in the direction of gravity and up is opposite the direction of gravity.

Cutting material 116 has an exposed surface 242 and an opposing unexposed surface. In one embodiment cutting material 116 forms a continuous belt where a portion of the exposed surface faces in a direction away from table 112 and the opposing surface faces toward the table 112. Cutting material 116 forms a continuous belt so as cutting material 116 is moved about the table the exposed surface will face away from the direction of gravity and when the portion of the cutting material 116 moves about the first roller and the exposed surface will face toward the direction of gravity when the portion of cutting material is located below table 112.

First cutting material 116 may be a self-healing material which as used herein is any material which is designed to endure repeated impacts from a mechanical blade without serious functional deterioration. By way of example a blade supported by cutting head is made to cut through a sheet supported by first cutting material 116 and extend into first cutting material 116. Material 116 is formulated from a material such that a cut into the first cutting material 116 allows continued use of the first cutting material 116 for subsequent operations where a blade cuts additional sheets being supported by first cutting material 116. Sheets may be paper, cardboard, cloth, plastic or other material typically used in advertising but may be used in other applications as well. First cutting material 116 is often referred to as a gray belt in the machine cutting business. A workpiece supporting surface is described in U.S. Pat. No. 5,141,212 as being a foam sheet formed of "reticulated open cell polyurethane foam" and "where the foam is charcoal grey in color." A cutting material support is also described in U.S. Pat. No.

6,945,645 as including but not limited to elastomers and plastics, self-healing mat material, neoprene, rubber and polyurethane.

Cutting head 128 may also include a laser cutter directing the output of a high-power laser, by computer, at the sheet 134 of material to be cut. Portions of sheet 134 are then either melts, burns, vaporizes away, or is blown away by a jet of gas leaving an edge with a high-quality surface finish. Since a laser operates at an elevated temperature, self-healing cutting surfaces 116 known in the art may also be melted, burned or vaporized away. In one embodiment a second cutting material 142 having a higher melting and burning temperature point may be used with cutting table 112. The movement of a cutting head relative to a cutting material is well known in the art. Cutting head 130 may be moved in an x-y direction by movement of cutting head along horizontal rail and by moving the horizontal rail along the vertical rails. It is also possible to include other controls to provide an angular tilt from the z axis so the cutting tool cuts sheet 134 at an angle other than perpendicular to the plane defined by the top surface 136 of sheet 134. Cutting head 130 may also move in an up/down direction along the z axis to move a cutter toward and away from first and or second cutting material 116, 142.

Figure 2:
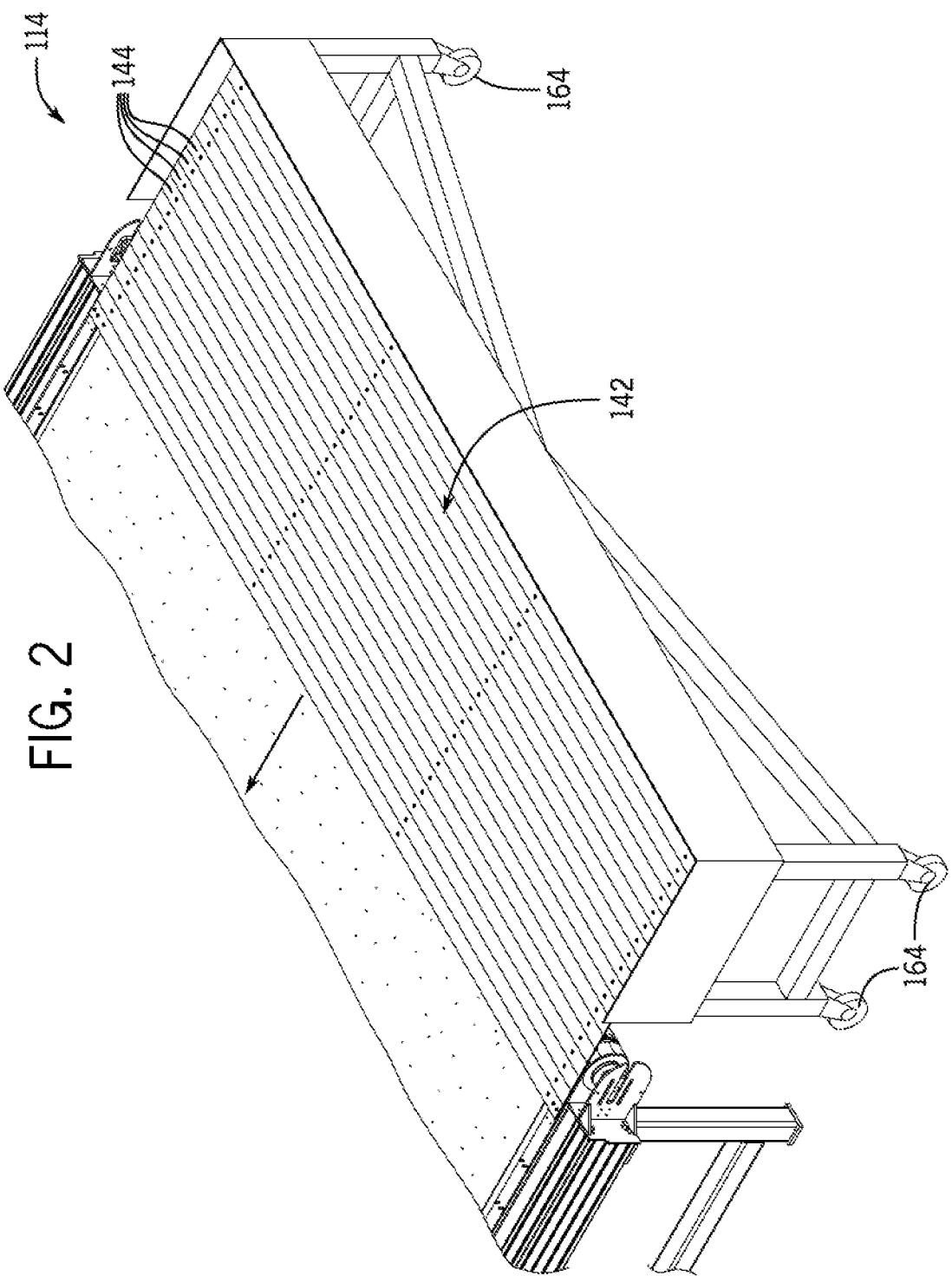
FIG. 2 is a top isometric view of the cutting system of FIG. 1 with the surface loader in a second engaged position.
Figure 3:
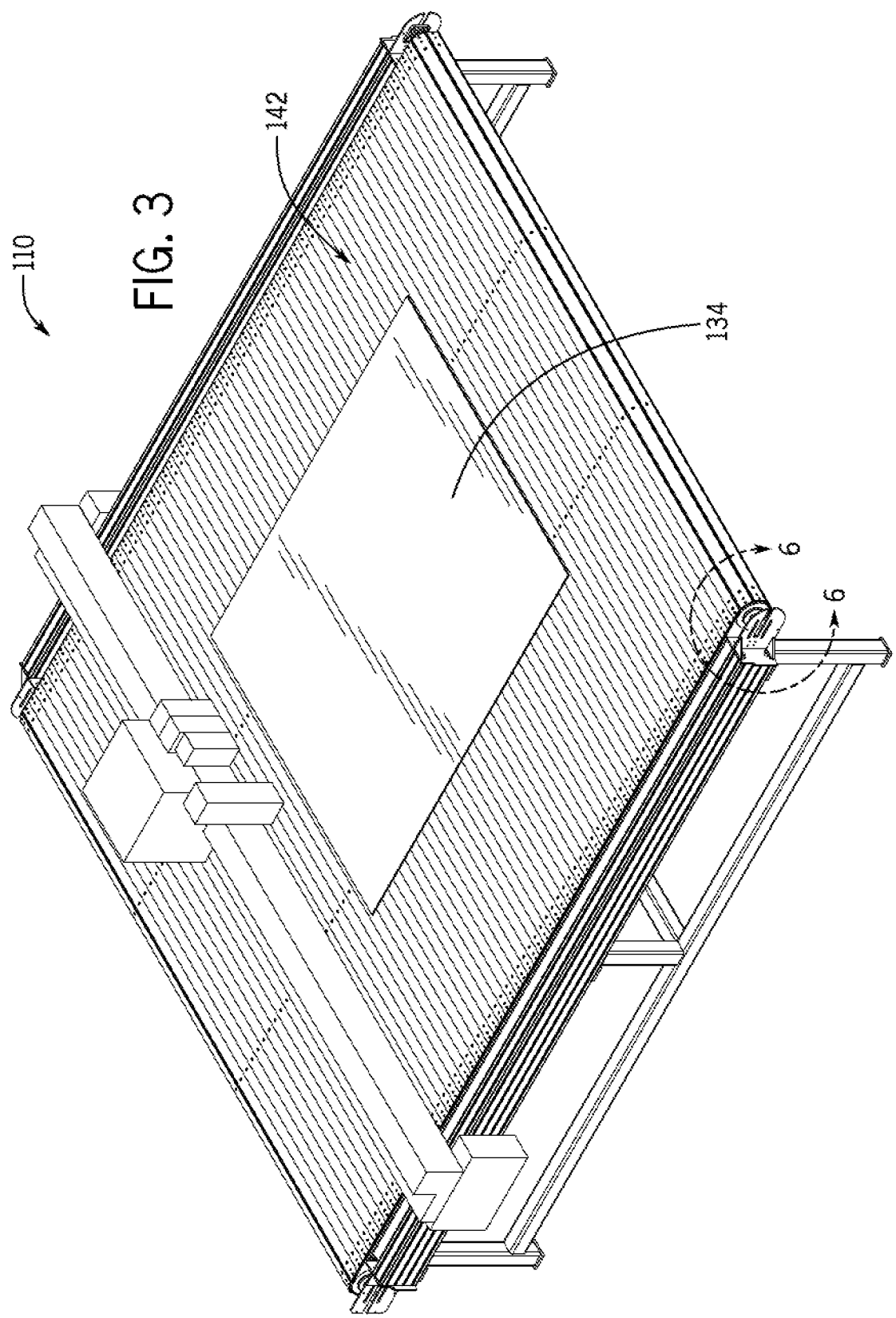
FIG. 3 is a top isometric view of the cutting system of FIG. 1 with the surface layer loaded onto the table.
Figure 4:
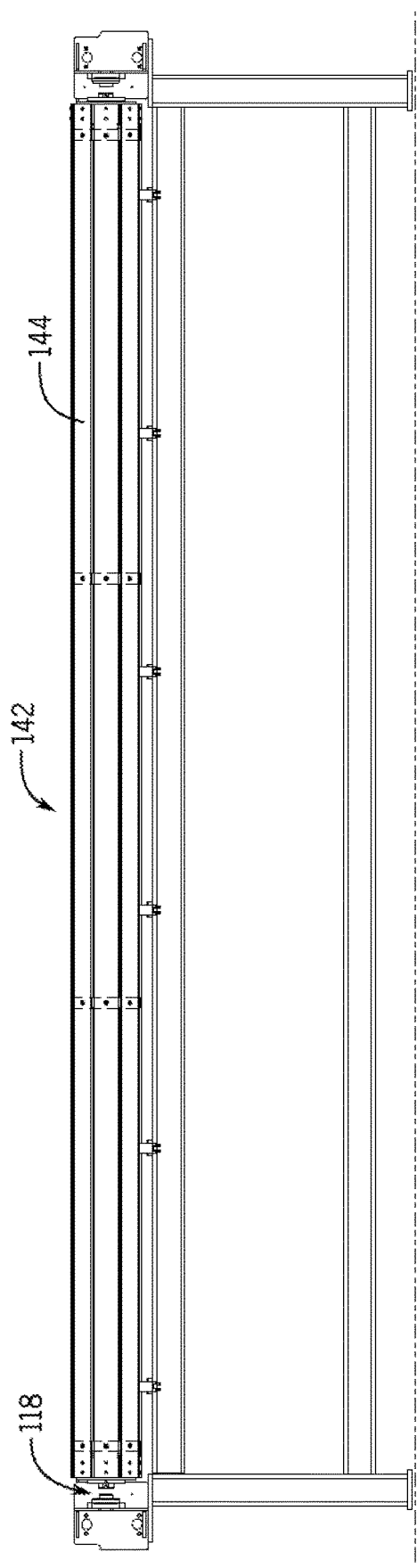
FIG. 4 is a front view of the cutting system of FIG. 3.
Figure 6:
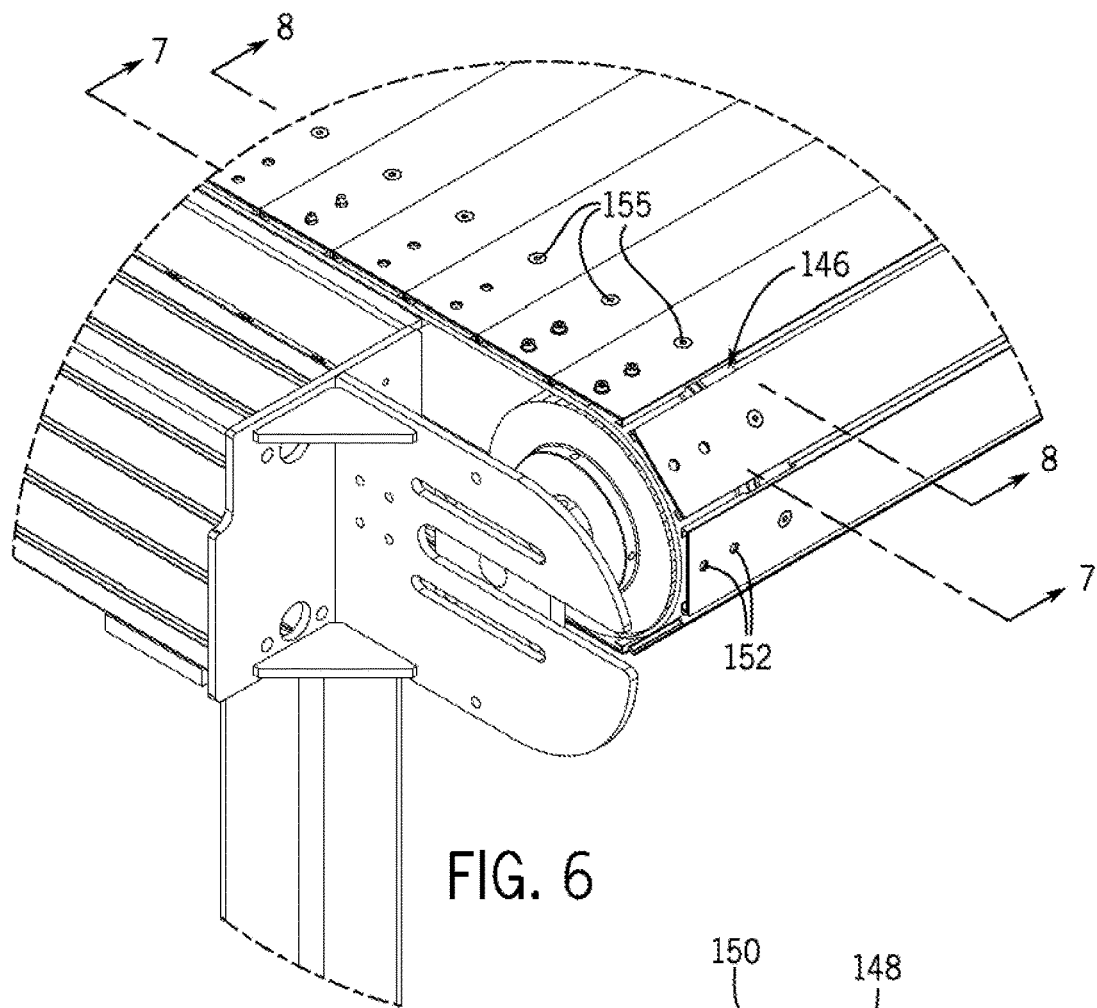
FIG. 6 is close up view of FIG. 3 generally taken along area 6-6.
Figure 7:
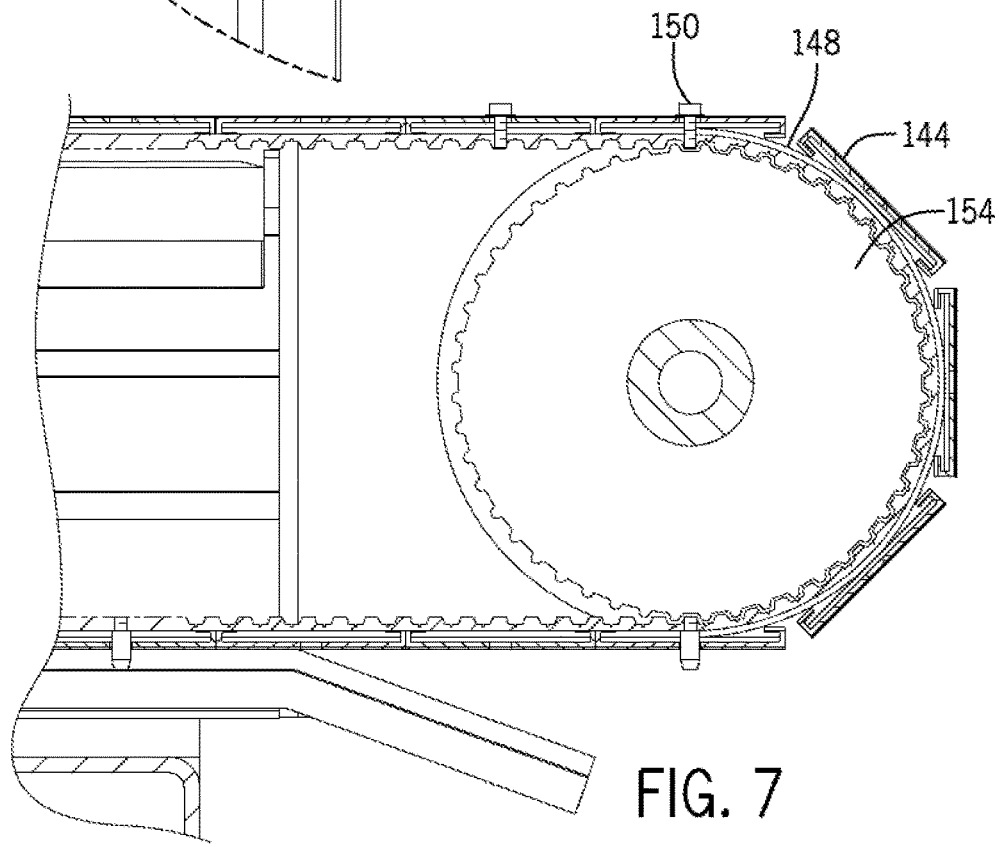
FIG. 7 is a cross-sectional view taken generally along lines 7-7 of FIG. 6.
Figure 8:
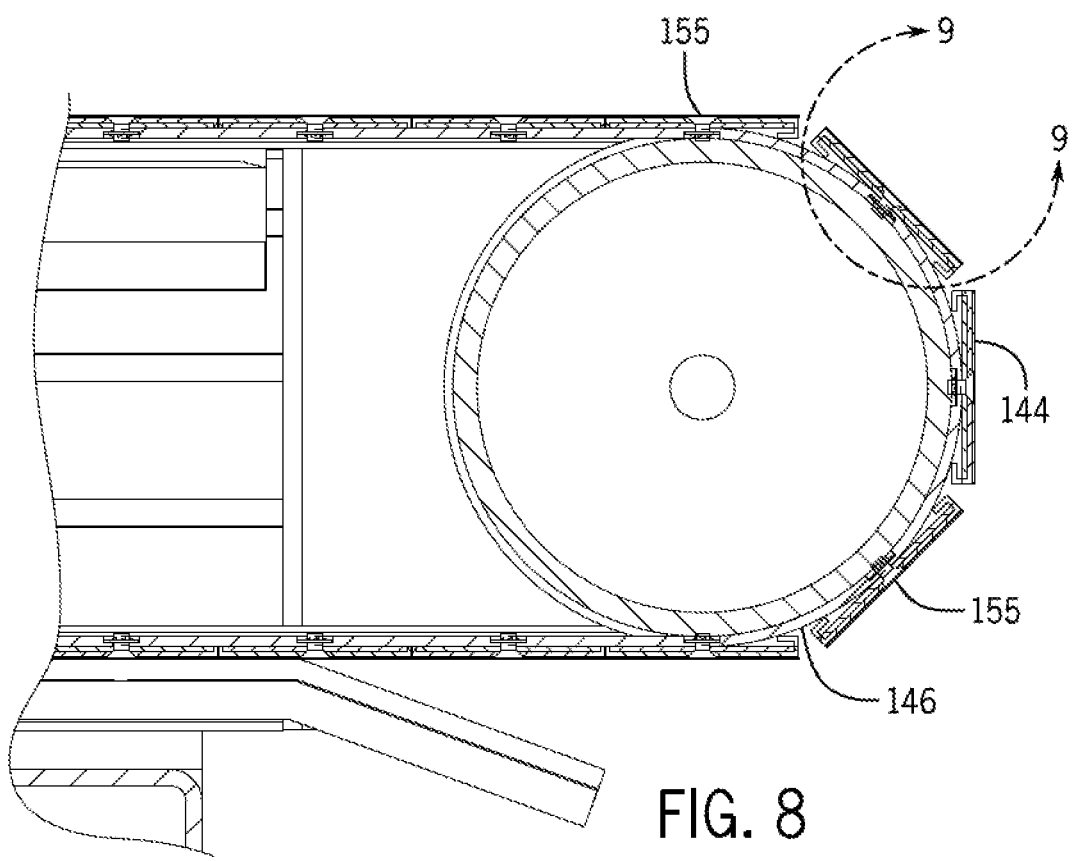
FIG. 8 is a cross-sectional view taken generally along lines 8-8 of FIG. 6.
Figure 9:
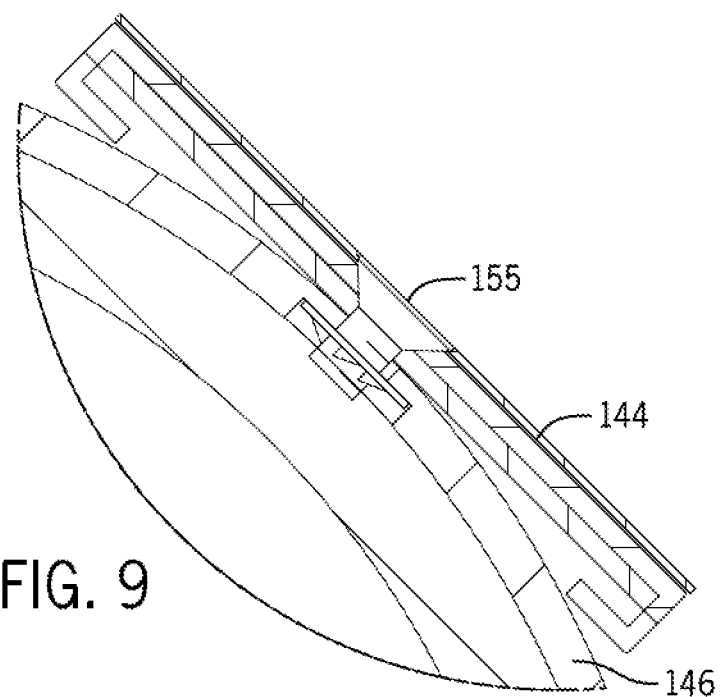
FIG. 9 is a cross-sectional view taken generally along lines 9-9 of FIG. 8.

Referring to FIG. 2, second cutting material 142 is loaded onto cutting table 112 from transfer station 114. In one embodiment second cutting material 142 is formed from a plurality of metal slats 144 movable connected to one another with a connector 146. Referring to FIG. 6 connector 146 is a flexible ribbon that is connected to each slat 144 with a rivet 155, through an opening 153, or other connector known in the art to operatively secure each slat 144 together to form the second cutting material 142. In one embodiment metal slats 144 are formed from an aluminum material or aluminum alloy or other material having a melting and burning temperature above that of the heat transfer from the laser cutter to the surface second cutting material 142. In one embodiment, cutting table 112 includes a second drive system having a drive belt 148 having a plurality of pins 150 extending therefrom. Each pin 150 being removably received in a corresponding aperture 152 of a slat 144. In one embodiment, drive belt 148 includes a plurality of a pair of pins 150 with each pair of pins 150 being received in a corresponding pair of apertures 152. A drive wheel 154 is driven by a motor (not shown) in a clockwise and counter-clockwise moving drive belt in fore and aft direction. In one embodiment, a second drive belt is positioned parallel and spaced form first drive belt 148 includes a plurality of pins 150 that engages corresponding apertures 152 positioned on each slat 144 remotely from the apertures 152 that engage with pins 150 operatively connected with first drive belt 148.

Referring to FIG. 2, transfer load station 114 is positioned relative to cutting table 114 and each slat is secured to the first and second drive belts by positioning the apertures 152 over the corresponding pints 150. Once the first slat 144 or first few slats 144 are secured to the first and second drive belts, the drive belts maybe driven in a direction toward rear 140 thereby transferring all of slats 144 onto cutting table 112. In one embodiment, pins 150 provide a tight fit with apertures 152 thereby allowing slats 144 to remain connected to pins 150 and the drive belts as slats 144 are moved about a rear roller proximate rear portion 140 and under cutting table 112. In this manner once all of slats 144 are transferred to cutting table 112, slats 144 make a continuous cutting surface that extends over an upper surface of cutting table 112 around the rear portion 140 under a lower surface of cutting table 112 and around front portion 138. Once all of the slats 144 have been transferred to cutting table 112, transfer station 114 may be moved away on roller wheels 164. In one embodiment belts 148 may be formed from a material such as para-aramid synthetic fiber sold under the trademark Kevlar. Slats 144 may be removed from cutting table 112 and transferred to transfer station 114 in a reverse manner. Pins 150 are removed from a first slat or leading edge slat and positioned within transfer station 114, drive belts 148 are moved in a direction such that the slats are moved from the belts 148 into transfer station 114.

Figure 5:
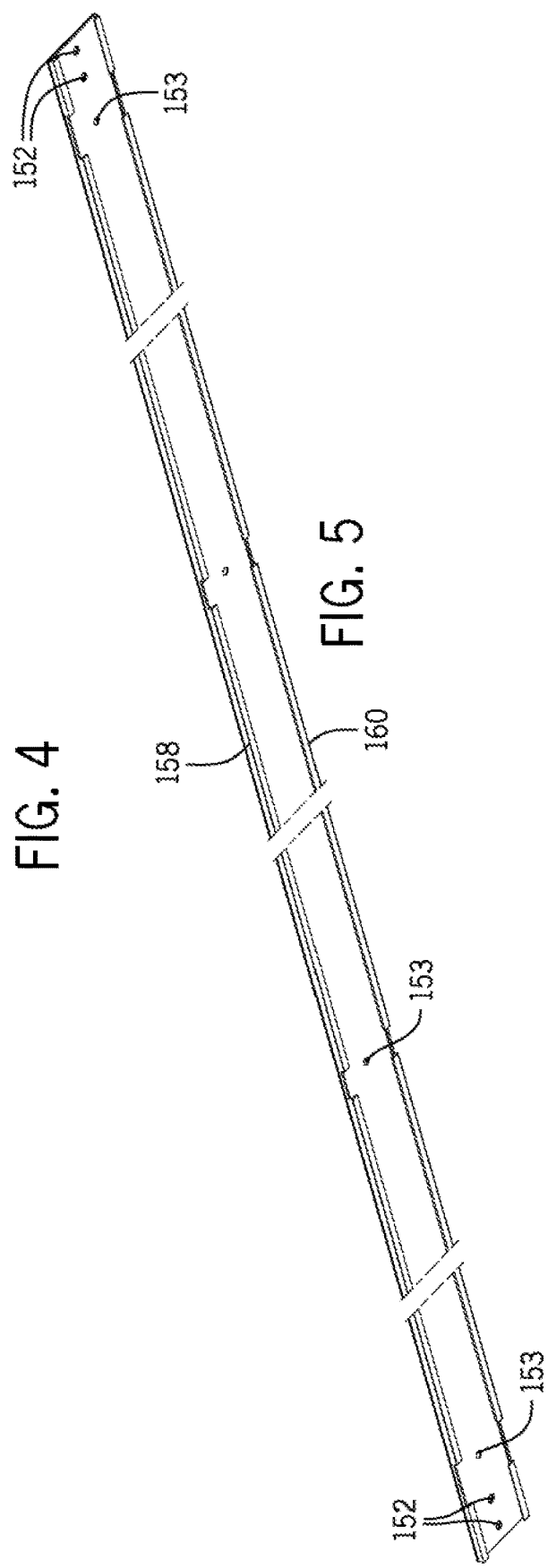
FIG. 5 is a view of a portion of the surface of FIG. 3.

Referring to FIG. 5 each slat 144 includes a first longitudinal edge 158 and a second longitudinal edge 160 spaced from and generally parallel to first longitudinal edge 158. In one embodiment not shown longitudinal edges 158, 160 may be beveled such that when slats 144 are in the flat parallel orientation a portion of edge 158 is below the corresponding edge 160 of an adjacent slat. In this manner the laser is fully blocked from a laser beam extending between adjacent slats 144. Of course other edge geometry that provides a continuous slat surface such that a laser targeted perpendicular to an upper surface 162 of slat 144 would not be able to pass through a region between adjacent slats 144.

In one embodiment first cutting material 116 moves along with second cutting material 142. In another embodiment second cutting material 142 may be moved independently of the first cutting material 116.

While second cutting surface has been described as aluminum slats, other types of materials are also contemplated including but not limited to a metal mesh, a para-aramid synthetic fiber such as that sold by Kevlar and having a melting and burning temperature above a corresponding temperature of the laser that may be used for cutting purposes. Additionally it is contemplated that the first cutting surface include a portion that is formed from a high heat resistant material and positioned either to one side (x-axis) of cutting table 114 such that a laser may be used for cutting on one side while a traditional blade may be used on a self-healing type of material such as felt may be on a second side (x-axis) of cutting table 114.

Figure 10:
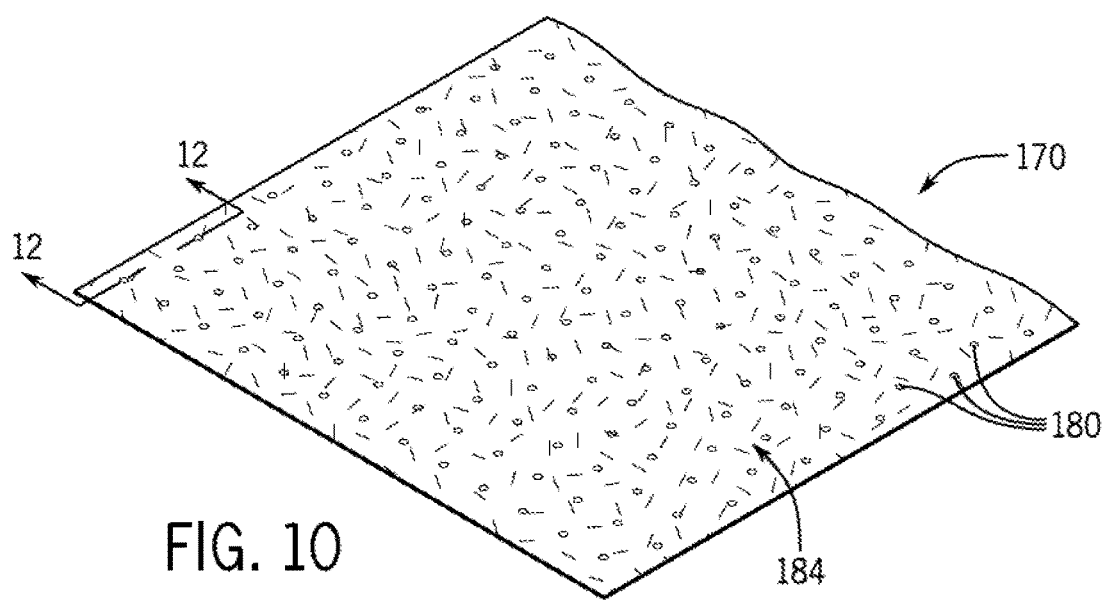
FIG. 10 is an isometric view of a surface material.

Referring to FIG. 10 in another embodiment a second cutting material 170 referred to herein as the laser cutting belt or laser belt includes aluminum foil 174. In one embodiment the aluminum foil 174 is between 1 mil (0.001 in) and 10 mil thick (0.010 in). In one embodiment the aluminum foil is 5 mil thick. In one embodiment the aluminum foil layer is between 4 mil and 5 mil thick. In other embodiments the aluminum foil has a thickness less than 1 mil and in another embodiment the aluminum has a thickness that is greater than 10 mil thick. In one embodiment the aluminum foil is greater than 1 mil thick. In one embodiment the aluminum foil 174 is mounted, adhered or laminated to a carrier material 176. In one embodiment the carrier material 176 is one of polyurethane, fiberglass, or other similar materials. The carrier material in one embodiment is between 1-3 mm thick. In one embodiment a 1 mil-10 mil aluminum foil is sufficient to scatter the laser beam and serves as great cutting underlay when cutting fabrics. In one embodiment the aluminum foil may be pure aluminum or an alloy containing other metals.

In one embodiment the aluminum foil 174 will be perforated with a plurality of apertures 180 to allow air flow to hold the graphic 134 substrate in place relative to the second cutting material 170 as well as to remove fumes that are created from the cutting process. A vacuum supplied to the underside of the first cutting material 116 draws air through the aluminum foil 174. In an embodiment in which aluminum foil 174 is secured to a material 176, the vacuum will draw air through the apertures in aluminum foil 174 through the carrier material 176 and through the first cutting material 116.

Figure 12:
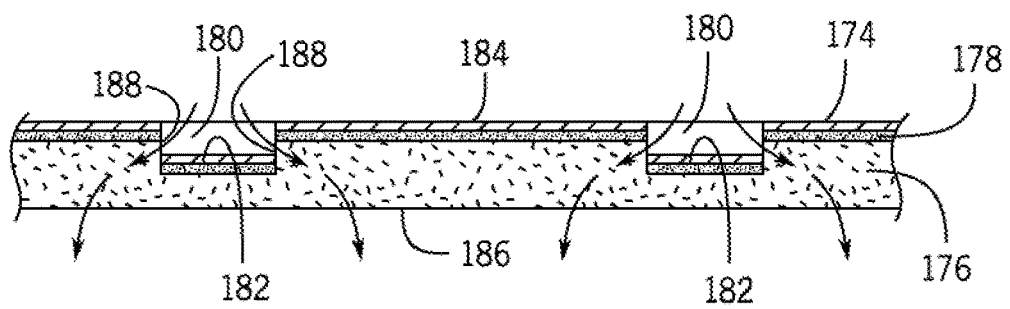
FIG. 12 is a cross sectional view of the surface material taken generally along lines 12-12 of FIG. 10.

Referring to FIG. 12 each aperture 180 is formed by punching a disk 182 from aluminum foil 174. Disk 182 is pushed a distance from the top surface 184 of aluminum foil 174 toward a bottom surface 186 of carrier material 176. As a result a gap 188 is created between aluminum foil 174 and disk 182. Disk 182 has an upper surface that is not co-planar with the top surface 184 of aluminum foil 174 when the disk 182 is pushed into the carrier material 176. The arrows in FIG. 12 illustrate the direction of air flow. This air flow caused by the vacuum that draws air from the top region above the top surface 184 downwardly toward bottom surface 186. This vacuum allows a graphic sheet 134 to be cut to be held against the top surface 184 of aluminum foil 174. In one embodiment first cutting material 116 may be moved by conveyor system. The second cutting material is then moved along with the first cutting material 116 and in turn graphic material 134 is moved with the first cutting material and second cutting material as well.

Figure 14:
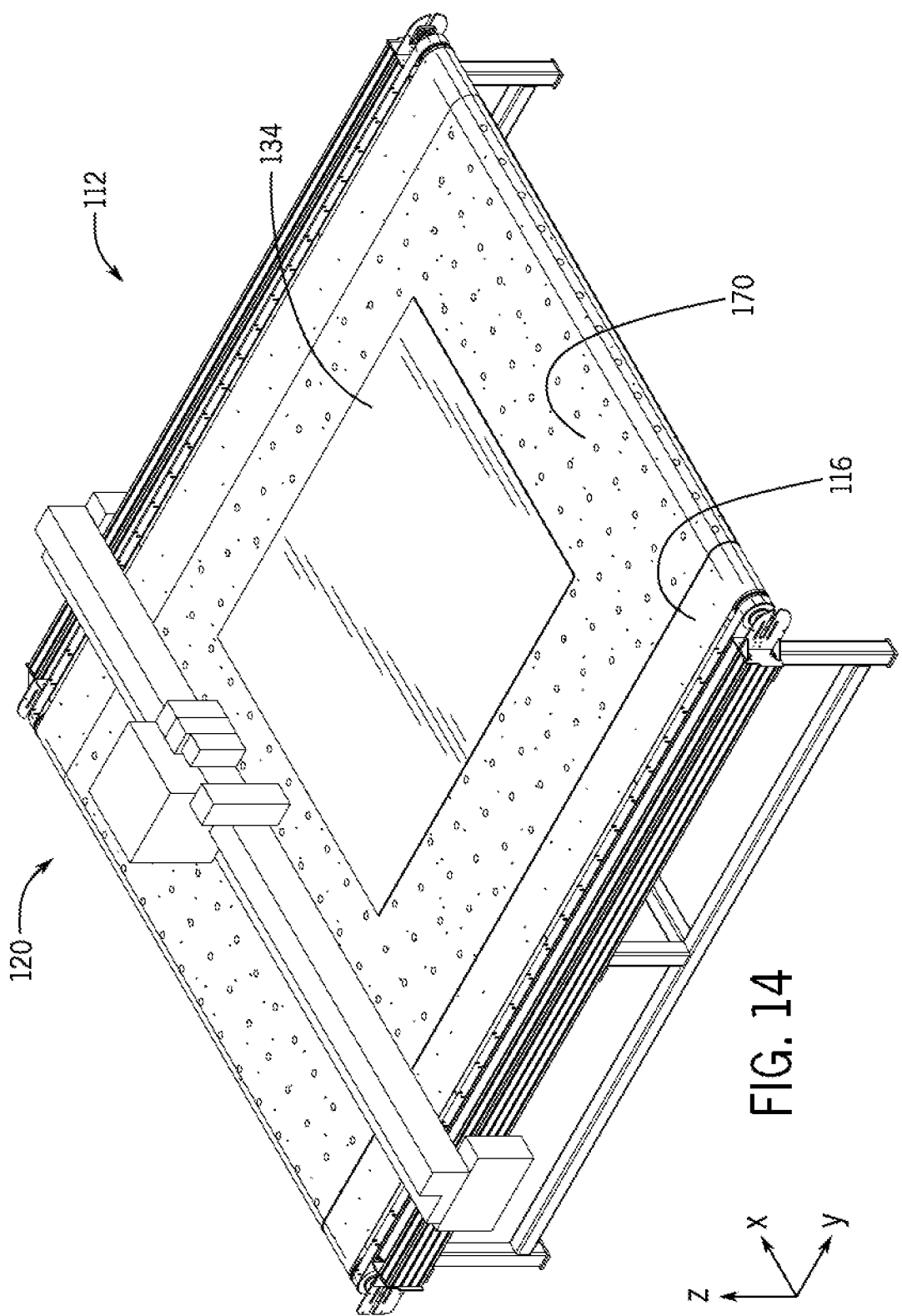
FIG. 14 is a top isometric view of a cutting system with the surface material positioned on the conveyor material with a graphic material positioned on the surface material.

In one embodiment second cutting material has a thickness of 1.8 mm measured along a vector direction from top surface 184 perpendicularly downward to ward bottom surface 186. In one embodiment disk 182 is positioned half way between upper surface 184 and bottom surface 186. In one embodiment the location of disk 182 is more than or less than 50% of the distance between upper surface 184 and bottom surface 186. The location of disk 182 must provide a sufficient annular opening 188 so that the vacuum can adequately retain graphic sheet 134 against the upper surface 184 during the cutting operation and/or during movement of the second cutting surface about the rollers in the y vector direction as illustrated in FIG. 14.

The combined carrier layer 186 and aluminum foil layer 174 is sufficiently flexible, that they can rolled around the rollers at each end of the cutting machine and act as a conveyer system to transport the fabric thru the system. The combined carrier layer 186 and aluminum foil layer 174 is placed on top of the first cutting surface or primary bel belt which is used for knife cutting. When the operator wishes to switch from laser cutting, he/she will simply remove the combined carrier/aluminum foil and now the primary belt is used for blade cutting. While aluminum is identified as the foil material other materials may also be used. Note that the aluminum foil may have other thicknesses than indicated herein. Also the substrate may be other materials such as but not limited to fiberglass.

Aluminum foil layer 174 is bonded to carrier layer 176 through at least one of pressure and heat. The application of pressure and/or heat creates a bond layer 178 between the carrier layer 176 and aluminum foil layer 174. The carrier layer may be treated with an adhesive intermediate the carrier layer and the aluminum foil layer, or the carrier layer may be formed of a material that bonds to the aluminum foil layer with the application of pressure and/or heat. For example in one embodiment the carrier layer includes a polyurethane material that melts under the application of pressure and/or heat and bonds to the aluminum foil. Such a bonding process results in a bonded material that does not significantly wrinkle as the composite carrier material and bonded aluminum foil is rolled about the system. The term wrinkle as used herein means a permanent crease or other raised or lowered ridge on the surface of the aluminum foil that is caused by movement of the aluminum foil in the cutting system 110 and/or movement to and from the storage module 114. It is believed that wrinkles are caused by different radius of top surface and lower belt surface onto rollers causing a compression of the aluminum layer when the belt comes off the rollers. Wrinkles may lead to cracks in the aluminum and delamination of the aluminum from the carrier. Cracks and or delamination may lead to the laser penetrating the aluminum layer and burning the carrier or even then first belt.

In one embodiment apertures 180 are formed by a punch having a cross section between 50 mil and 150 mil forming aluminum foil disks 182. The punch separates the disk 182 from the aluminum foil 174 and moves the disk toward the bottom surface 186 of the carrier material 176. Disks 182 are clipped off evenly by the punch tool, then pressed flat halfway into the carrier material 176 belt without too much of the carrier material protruding on the bottom surface 186 of the carrier material. Stated another way, the movement of disk 182 into carrier material 176 may cause the bottom surface 186 under disk 182 to protrude away from the bottom surface 186 of carrier material casing a dimpled effect. In one embodiment the protrusion of material is between 20 mil and 30 mil. It is noted that the location of disk 182 downwardly into carrier material 176 is greater than the distance of the protrusion as some of the carrier material 176 is compressed.

To allow sufficient airflow caused by the vacuum the closeness or density pattern of the holes 180 created by disks 182 can be high between 25%-45% of the surface area of the aluminum foil 174. The open areas 180 defined by holes 180 help to make the final construction of the belt more flexible when passing by conveyer rollers. The cumulative area defined by all holes 180 is referred to as the open area of the aluminum foil 174. In one embodiment the open area defined as a percent of the total area of aluminum foil 175 is between 25% and 45%. Of course it is contemplated that the percent area of openings 180 to the entire surface area of the aluminum foil 174 may be less than 25% or greater than 45%.

In one embodiment the punch sizes may be 60 mil, 94 mil, and 150 mil to create openings of varying diameter. In one embodiment disks are 182 are circular creating an annular opening 188. However other noncircular disk shapes are contemplated as well.

In one embodiment, aperture 180 extends clear through aluminum foil 174 and carrier material 176 such that disks 182 are completely removed from second cutting material 170. Maintaining disks 182 within carrier material 176 allow for a greater surface area of aluminum when a laser from above is being used to cut a graphic material 134. If disks 182 are removed completely, there is the possibility that a laser may travel through aperture 180 to the first cutting material 116 and would burn as a result. Disks 182 remaining in carrier material 176 allows for greater hole size providing more flexibility in the first cutting material 170 and providing for enhanced air flow for securing graphic sheet 134 to second cutting material 170 by the vacuum during the cutting process. The energy of the laser used to cut graphic sheets is known in the art. The second cutting material 170 has the material characteristic that the laser when impinging on the second cutting material 170 after cutting through the graphic sheet will not melt or burn the second cutting material 170. Stated another way the melting temperature and the burning temperature of the second cutting material 170 including the aluminum foil 172 and disks is such that the surface of the aluminum foil 172 and disks 182 will not burn when the laser is cutting through a graphic sheet as is known in the art. In one embodiment the graphic sheets are the type that are used for in-store displays and/or posters. Graphic sheets may be paper, Styrofoam, cardboard, plastic or other types of display material.

Figure 15:
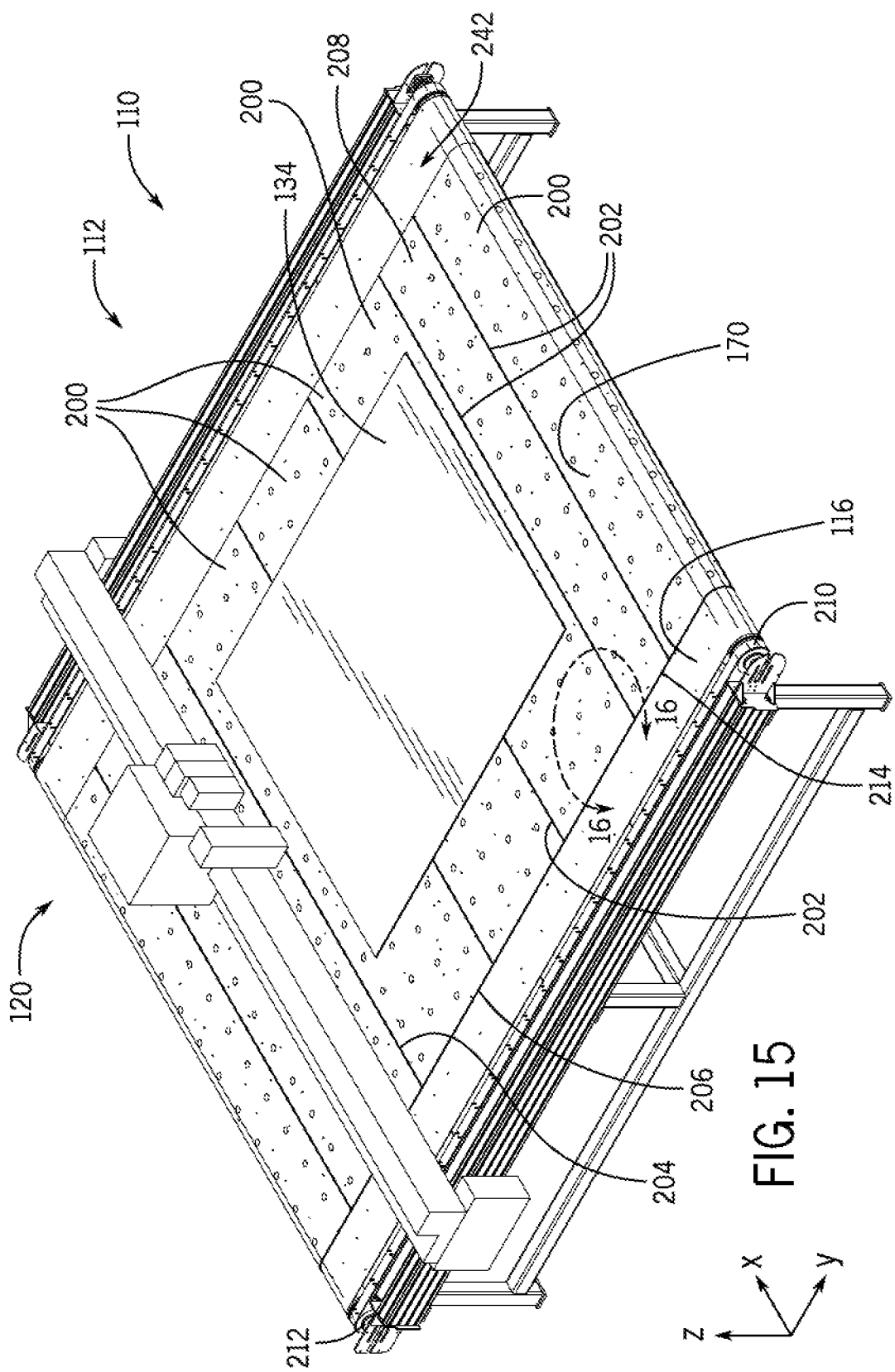
FIG. 15 is a top isometric view of a cutting system with a laser cutting belt on top of a first cutting belt.

Referring to FIGS. 14 and 15 in one embodiment the belt is formed from a base substrate of fiberglass and includes a first layer of aluminum foil bonded to the substrate of fiberglass. The first layer of aluminum foil is bonded to the fiberglass with an adhesive. In another embodiment a second layer of aluminum foil is bonded to the first layer of aluminum with an adhesive material. In this embodiment the belt is formed of a base substrate formed of fiberglass, a first layer of aluminum bonded to the fiberglass and a second layer of aluminum foil bonded to the first layer of aluminum with an adhesive.

Referring to FIGS. 14 and 15, the belt may include score lines or creases that run perpendicular to the movement of the belt. The scoring of the aluminum layer or layers allows the belt to be rotated about the rollers while minimizing or eliminating creasing of the aluminum foil layer on the belt as the belt is moved over the rollers from a first orientation on top of the table to a second orientation under the table.

In one embodiment the aluminum foil 174 is another metal material. In one embodiment the foil 174 is embossed with a pattern. The pattern may be the pattern of the carrier material substrate as the aluminum foil is pressed onto the carrier material. Alternatively a pattern may be embossed onto the aluminum foil itself. It is believed that the embossed patter assists in scattering the laser energy.

The top aluminum foil layer assists in scattering laser energy applied to the belt to minimize or eliminate burn thru or residues left on the fabric being cut by the cutting machine by the laser. The fabric being referred to is the fabric that is on top of the belt and being cut by the laser.

In one embodiment, the base layer of fiberglass is woven providing flexure stretch and compression properties so it conveys and rolls up onto the storage module 114 when not in use without causing wrinkles or dents in the top aluminum foil.

Figure 13A:
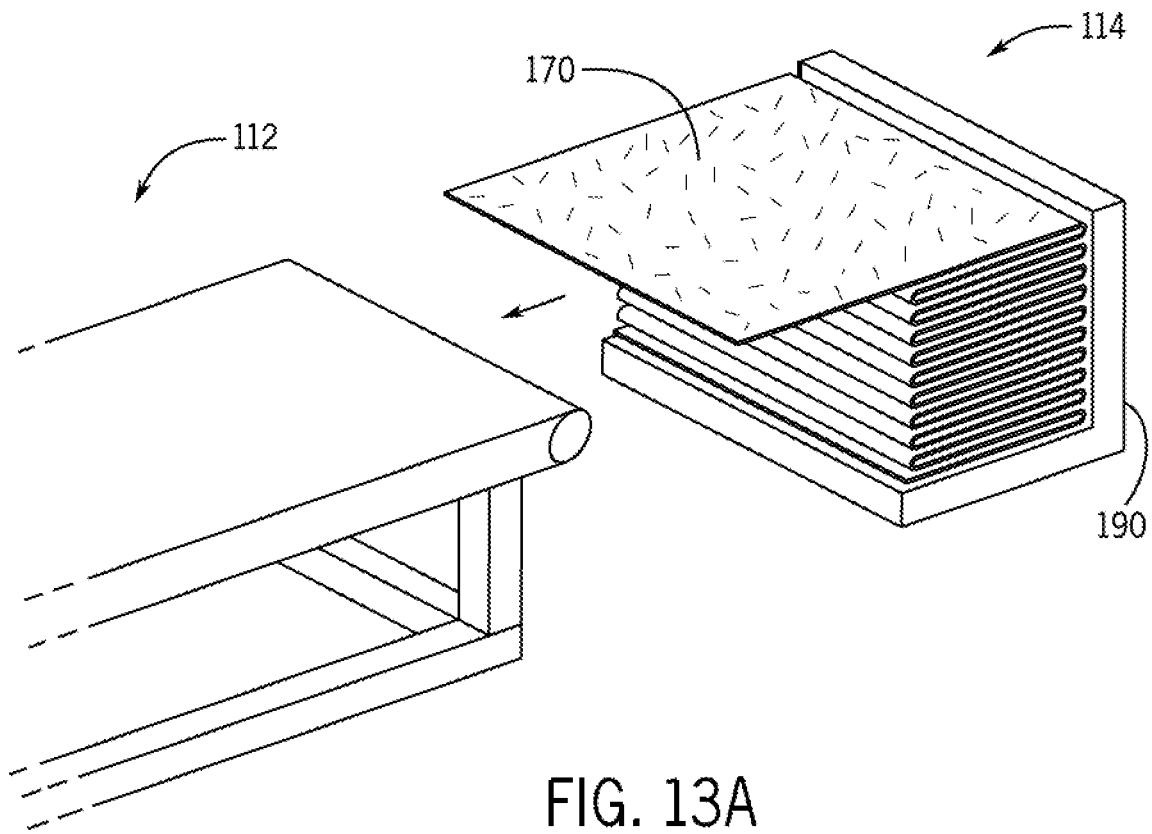
FIG. 13A is a surface material loading station in one embodiment.
Figure 13B:
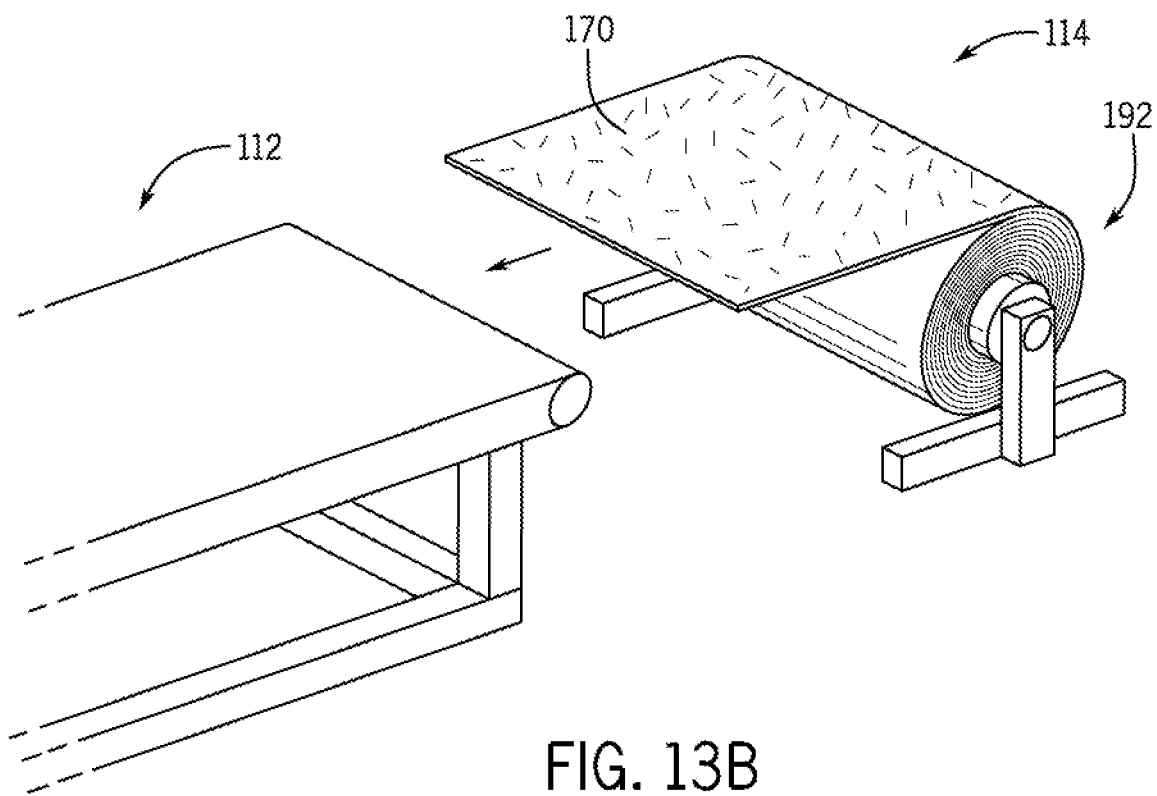
FIG. 13B is a surface material loading station in a second embodiment.

Referring to FIG. 13A storage module 114 is a bin 190 from which second cutting material 170 may be stored in an accordion fashion. Referring to FIG. 13B in one embodiment storage module 114 is a roller system in which second cutting material may be stored on a roller. Roller system 192 may include motors to wind and unwind secondary cutting material 170 between storage module 114 and cutting table 112.

In one embodiment the aluminum layer is applied to the base layer from a roll having sufficient length to provide the entire length of the cutting surface. In another embodiment the aluminum layer is formed from a plurality of sheets that are secured to one another along their adjacent peripheries to form the entire length and width of the cutting surface.

The carrier material may be formed of a material having a high friction to the first cutting material conveyer belt which makes indexing and conveying more precise and reliable.

In one embodiment the apertures 180 are between 1 mm and 3 mm in diameter and are drilled or punched, spaced 25 mm apart in both X and Y direction, thru the aluminum layer(s). The open, woven, carrier material allows the vacuum flow thru it. The vacuum serves to hold the graphic sheet 134 to be cut in position while cutting is taking place by a laser.

Figure 11:
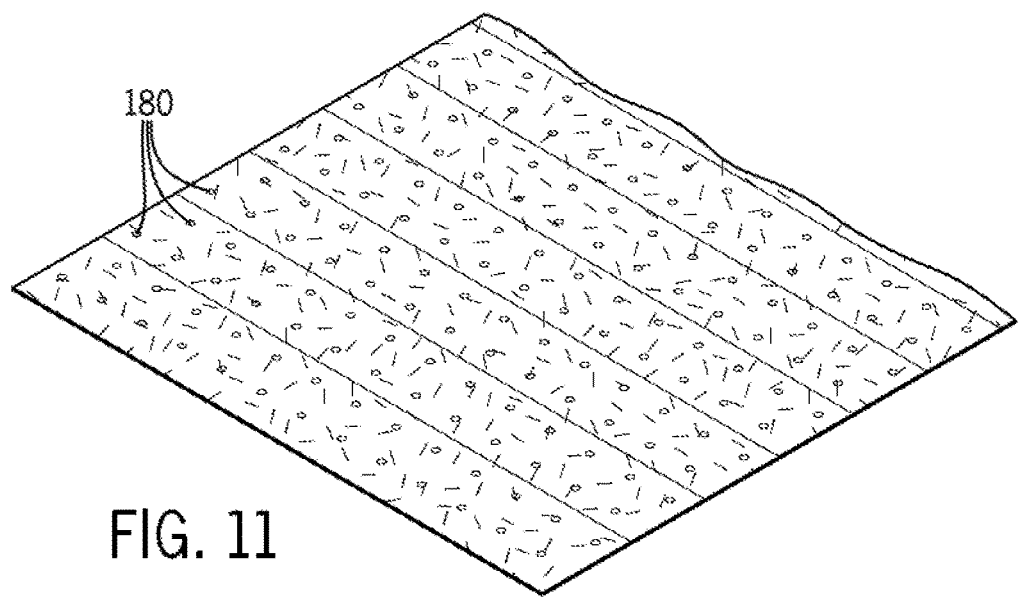
FIG. 11 is an isometric partial view of the surface material of with SCORES extending across the surface material.

Referring to FIG. 11 in one embodiment, creasing or scoring lines are added in the Y (and potentially X) direction to make the belt more bendable and avoid wrinkles, dents, from the conveying process. Scoring of the surface of the belt may be added to make the aluminum surface more uneven, scattering the laser energy further. An uneven, textured surface, can also be achieved during lamination of the aluminum foil to the woven fiberglass which structure will show thru using high lamination pressure.

When a user switches to blade cutting, the user removes the aluminum/fiberglass belt onto a roll-up device and the primary blade cutting belt is now exposed and ready for use. In one embodiment the laser belt is relatively light weight so one operator can remove it (or put it back on) with relative ease using the roll-up/off rack.

In one embodiment the base carrier material that the aluminum foil is adhered to is a Habasit Conveyor Product under the number CM100FBS and in one embodiment the base material the base belt material that the aluminum foil is adhered to includes a cotton fabric having a nonwoven structure that may include a polyester scrim on the traction belt side. In one embodiment a 5 mil aluminum foil is adhered to the base material such as the Habasit material having a thickness of 65 mil with a 5 mil double sided adhesive tape. In one embodiment a user applies a 6 ft.×4 ft tape such as a tape sold by Tesa or other double sided pressure sensitive adhesive made by 3M or other companies to stick the second cutting material to a first cutting material such as a standard gray conveyer belt known in the art that serves as the cutting surface when the second cutting material is not in use. Stated another way the second cutting material may be employed only when a laser is going to be used to cut a graphic material. Second cutting material having a metal foil and a carrier material may be referred to as the metal laminated laser belt or aluminum clad belt.

Second cutting material 170 has two distal ends. The two distal ends are removably connected together to provide a continuous belt about the cutting table 112. The two distal ends may be connected with a loop and fastener connector or other connectors known in the conveyor belt art.

A cutting machine includes a standard first cutting material or conveyor belt to which the aluminum clad belt is secured to and/or over. Accordingly, depending on the application the aluminum clad laser belt is left on the cutting machine conveyor belt or it is removed and stored on a storage module In one embodiment the base material to which the aluminum foil is secured has sufficient porosity to allow a vacuum to extend there through. A plurality of holes are punched through the aluminum foil while secured to the base material. In one embodiment holes are punched in a row every 1 inch. In another embodiment holes are punched in a row every ½ inch.

In one embodiment the aluminum foil is 4 mil thick, and the carrier material is 125 mil thick. The apertures 180 each have a diameter of between 100 mil and 125 mil. There are enough apertures in the aluminum foil to provide between 25% and 25% open area. In one embodiment the top surface of disk 182 is positioned between intermediate the top surface of the aluminum foil and the bottom surface of the carrier material. In one embodiment disk 182 has a planar shape and in another embodiment disk 182 may have a non-planar shape such as cone or other arcuate shape. The annular opening created by the disk and the opening 180 of the apertures provide sufficient volume to allow the vacuum to hold the graphic sheet to the aluminum foil during the laser cutting operation and/or provide sufficient volume to provide efficient evacuation of vapors created during the laser cutting operation.

In one embodiment, the carrier includes a non-woven belt including an upper portion and a lower portion having a scrim mesh there between being secured with a polyurethane filler. In one embodiment at least part of the non-woven belt includes cotton. In one embodiment the non-woven belt includes primarily cotton fibers in combination with a polyurethane filler and/or scrim. An adhesive film is applied to an aluminum film forming a laminated aluminum. In one embodiment the adhesive is a thermal plastic polyurethane (TPU) film that is applied to an aluminum sheet between 4-6 mil in a lamination process. In one embodiment the aluminum sheet is 5 mil. The TPU film and aluminum film laminate may be rolled and then applied to the carrier material with heat and pressure to bond the aluminum/TPU laminated layer to the carrier. In one implementation the carrier material includes a plurality of divots or dimples covering its outer surface where the divot is concave extending from one surface toward the other surface. The lamination of the aluminum and TPU laminate to the carrier belt results in similar divot or dimple pattern on the aluminum outer surface. See the attached photograph/figures as an example.

When the laminated carrier belt, TPU and aluminum belt is rolled over a 6 inch diameter conveyor belt roller the aluminum layer does not wrinkle or crimp or delaminate. The composite belt is then perforated from the back side. A plurality of perforations are made through the carrier, TPU and aluminum laminate from the back side adjacent the carrier material. Stated another way a punch enters the carrier material first and subsequently exits the aluminum laminate. In this way the apertures through the carrier material remains sufficiently open to allow air to pass there through in a greater volume than if the perforations were made through the aluminum layer first and the carrier materials subsequently. In one implementation the aperture punch is 1.2 mm with open area of 2.5%. Stated another way the 1.2 diameter holes are spread across the surface of the aluminum taking up 2.5% of the area and the non punched regions makes up the remaining 97.5% of the surface area. The air permeates through the bottom surface of the cotton mate so that the perforations in the belt to not need to be aligned with the vacuum holes in the vacuum table.

In one embodiment, an adhesive layer such as a thermoplastic urethane or thermoplastic polyurethane (TPU) is laminated to an aluminum foil between 4 mil thick and 6 mil thick. The TPU may be in the form of a film 1 mil thick. In one implementation the adhesive layer is sold under the tradename DUREFLEX® PS8000 and may be 1 mil or may be greater than 1 mil or may be less than 1 mil. Similarly, the aluminum foil may have a thickness less than 4 mil or greater than 6 mil thick. Where one mil is one thousandth of an inch. The laminated TPU film and aluminum foil is then laminated together with heat and pressure to a carrier/belt. In one embodiment the carrier belt is sold under the tradename Cottonmate® by Habasit. In one embodiment the Cottonmate® belt is identified by Habasit as CM100FBS and item number H250000350.

During the lamination process the TPU flows at least partially into the fibers of the carrier belt which also includes a polyurethane filler. The result is that the final laminate provides sufficient rigidity and flexibility for the belt, TPU and Aluminum foil to be wrapped around a roller without wrinkling of the aluminum foil. A wrinkle as used here includes any permanent folding of the aluminum layer creating a permanent line, ridge or depression other than a dimple or convex depression caused by the aluminum matching the general contour of the belt material.

Once the belt, TPU and aluminum foil is completed the three layer laminated materials is punched creating a plurality of 1.2 mm holes extending through the bottom of the belt through the top surface of the aluminum foil. In one embodiment the punch includes a free end which first enters the bottom surface of the belt and subsequently extends through the aluminum foil such that the free end of the punch extends through the exposed upper surface of the aluminum foil. The rate of air flow through the aluminum foil and belt when placed on a vacuum table when the holes are crated with the punch entering the belt first is greater than the rate of air flow through the aluminum foil and bel when the holes are crated with the punch entering the aluminum foil first and then entering the belt material. It is believed that the fibers in the belt materials are preferably aligned when the punch enters the bottom exposed surface of the belt first and then subsequently enters the aluminum foil. This preferred alignment of the fibers provides for an increased flow of air. When a laser is used to cut a product on the aluminum foil, TPU and belt laminated material as outlined above, the laser does not extend through the holes or extend through the holes sufficiently to burn any underlying belt or material that is supporting the aluminum, foil, TPU and belt material.

The perforated carrier, TPU and aluminum laminated material is cut into rolls of 130 in wide belts. ALU tape is used for of laminated roll portions on a top side of the laminated materials and a Tesa tape is used on the opposite side. Whole belt is then cut into perfect rectangle (squared) and put on machine (typical size is 30 ft long×130 in wide). The laminated carrier, TPU and aluminum layers define a laser belt that supports a material that is to be cut by a laser. The laser belt can run on a standard gray cutting belt. However, the laser belt can also run without the gray belt if a user customer only does laser cutting and no blade cutting. The laser belt can be removed from the cutting equipment on to a storage roller allowing the cutting equipment to be used with a blade/router cutting elements.

The cutting table may be used for non-laser operations by removing the second laser belt and using the first cutting material as the conveyor and cutting surface for traditional non-laser cutting operations in which a non-metallic material may be used.

Referring to FIG. 15 cutting system 110 includes a laser cutting belt 170 formed from a plurality of panels 200 that form a continuous laser belt. Each panel 200 is connected to an adjacent panel with a lacing connection 202. Panels 200 have a common length as measured along the x-axis identified in FIG. 15. In one embodiment panels 200 have a common width as measured along the y-axis. The length of panels 200 is measured along an edge 204 while the width of panels 200 is measured along an edge 206. In one embodiment multiple panels 200 cover the top surface of table 112. A connection strip 208 secures two adjacent panels 200 together to form a belt that extends over top surface of table 112 over a first roller under the table 112 and over a second roller. The connection strip 208 may be fabricated to ensure that laser belt 170 fits a particular cutting machine geometry 110. The width of edge 214 of connection strip 208 may be varied while the layers that form strip 208 are the same as panels 200 as described herein. Individual panels 200 can be replaced if one is damaged or if the belt needs to be a different length. The modular panel assembly makes it fast and easy to build belts in different lengths. Panels may be stored in a flat planar orientation until a belt needs to be assembled after which the belt may be stored on roller.

Referring to FIG. 15 a first cutting belt 116 extends over table 112. Table 112 includes a top portion having a fixed aluminum honeycomb surface with vacuum holes. The first cutting belt rides over this fixed surface. A vacuum is applied to the top portion pulling air through the first cutting belt into the vacuum holes in the top portion.

In one embodiment roller 212 is driven by a motor and roller 210 is an idler roller that freely rotates about its longitudinal axis. The position of first cutting belt 116 is moved about the y-axis by rotation of roller 212. Laser Belt 170 is positioned on the first cutting belt and driven by movement of the first cutting belt.

Figure 16:
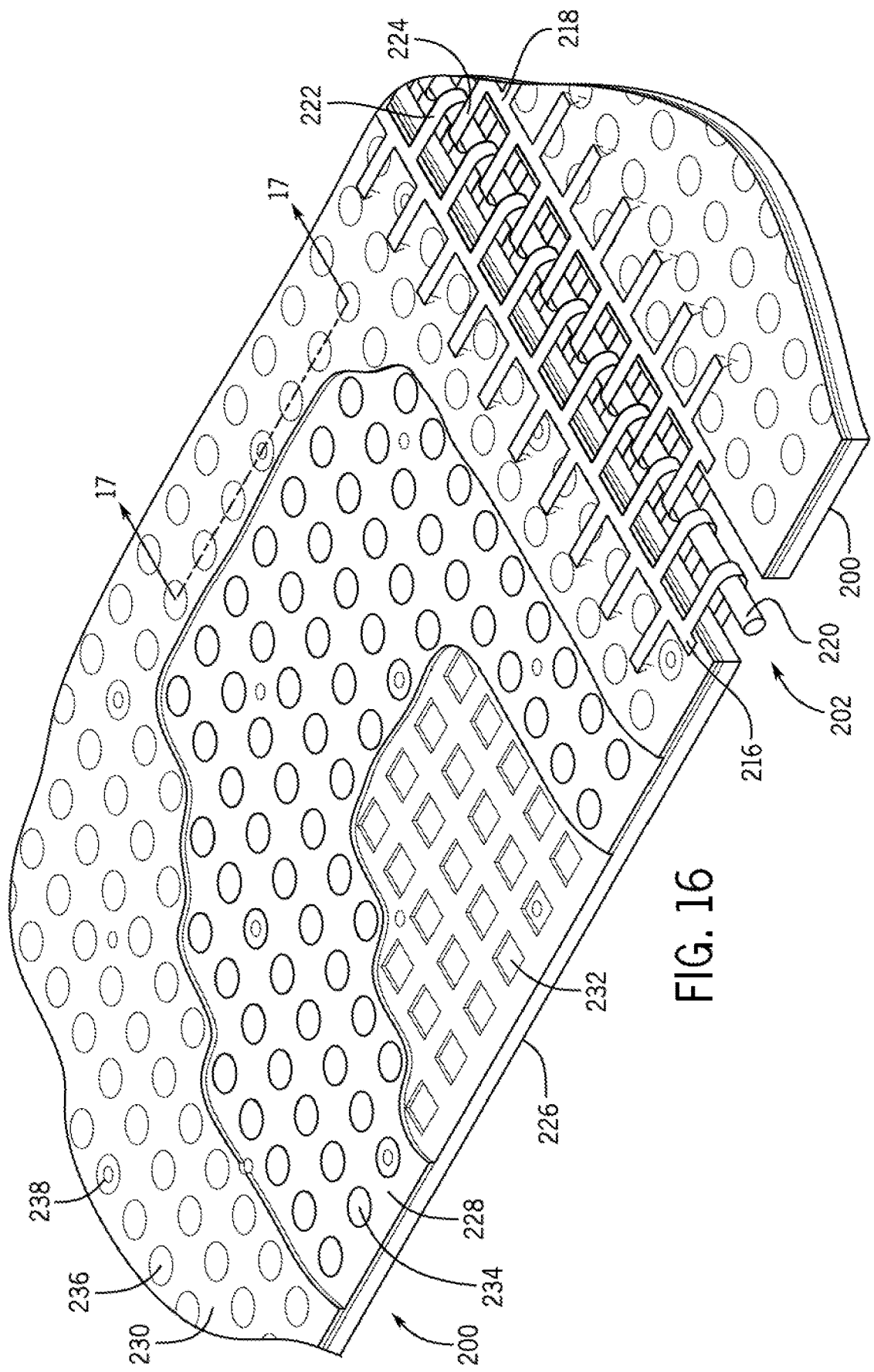
FIG. 16 is a partial cutaway view of the laser cutting belt and first cutting belt.

Referring to FIG. 16 lacing 202 includes a first portion 216 that is secured to a first longitudinal edge of each panel 200 and a second portion 218 that is secured to a second longitudinal edge of each panel 200 where the second longitudinal edge is spaced rom and parallel to the first longitudinal edge of each respective panel. First portion 216 and second portion 218 are similarly secured to a first longitudinal edge and second longitudinal edge of connecting strip 208. A connecting rod 220 is removably received in a plurality of openings 222 and openings 224 in respective first portion 216 and second portion 218. In this manner adjacent panels 200 are secured to one another. Note that first portion 216 and second portion 218 are able to pivot about connecting rod 220 as the laser belt rotates about rollers 212 and 210. The gaps between the various components of first portion 216 and second portion 218 as viewed from the z-axis are between 0.5 mm and 1 mm. This minimizes the space for the laser beam to get thru and cut into the first cutting material or grey below the laser belt.

Referring to FIGS. 16-18D each panel 200 and 208 include a base layer 226 having a center portion that is woven covered by a top and a bottom portion of nonwoven material. An intermediate layer 228 of thermoplastic polyurethane (TPU) is applied to a top layer of the base layer 226. A top layer of aluminum foil having a thickness between 4 mil to 6 mil thick is secured to the base layer by the TPU intermediate layer with the application of force and heat. The TPU layer 228 melts under the force and heat and operatively bonds the aluminum layer 230 to the base layer 226.

Referring to FIG. 16 a schematic illustration of panel 200 not drawn to scale illustrates that base layer 226 as a result of its woven center layer has a pattern that creates dimples or depressions 236 on the aluminum layer once the aluminum layer is secured to the base layer 226 by the application of pressure and heat. In one embodiment dimples 236 have a depth of 0.1 mm to 0.2 mm and a generally round shape at the upper most portion of the dimple. The upper most portion of the dimple is the area furthest from the base layer 226 in the z direction. It is believed that the dimple pattern on the exposed surface of the aluminum layer helps to dissipate the energy of the laser that may impact the exposed aluminum surface thereby minimizing any damage to the laser belt 170 during a laser cutting operation.

Once the aluminum layer 230 is secured to the base layer 226 by the TPU layer 228 a plurality of through holes are punched through panel 200. In one embodiment the through holes have a diameter of 1.3 mm. As a result the area of each opening at the exposed surface of the aluminum layer of the panel 200 is 1.327 mm² ($\pi(1.3 \text{ mm}/2)^2$). The number of through holes 238 on each panel is set such that the cumulative area of the opening of all the through holes is 0.6% of the entire surface area of the panel 200. In one embodiment the cumulative open area of the through holes is less than 1% of the entire surface area of the panel. In one embodiment the cumulative open area of the through holes is less than 0.3% of the entire surface area of the panel. In one embodiment the cumulative open area of the through holes is greater than 1%.

The diameter of the through holes and the frequency of the through holes are set to minimize any delamination of the aluminum layer from the base layer while allowing sufficient opening that a vacuum applied through first cutting material 116 will have sufficient force to hole a sheet to be cut to the exposed surface of laser belt 170. In one embodiment through holes 238 are arranged in a grid along the x and y axis where holes are positioned 15 mm apart on one of the x and y axis and off set 7.5 mm on the other of the x and y axis.

Figure 19:
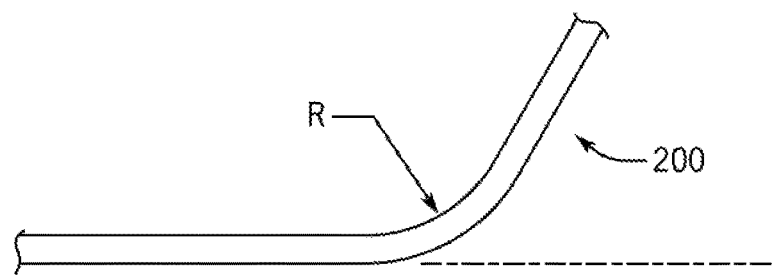
FIG. 19 is a schematic view of the laser cutting belt being bent at an angle having a radius.

Referring to FIG. 19 the allowable bending radius of each panel is greater than 3 inches. State another way the exposed surface of the aluminum layer 230 will not wrinkle as each panel 200 travels about the 6 inch diameter rollers 210 and 212. As discussed herein the term wrinkle as used herein means a permanent crease or other raised or lowered ridge on the surface of the aluminum foil that is caused by movement of the panels 200 in the cutting system 110. Specifically movement of each panel 200 about rollers 210 and 212 will result in the permanent formation of a crease in the exposed surface of the aluminum layer 230. In this manner laser belt 170 retains a surface free from permanent linear lines that may impede the operation of the laser belt during a laser cutting operation.

Figure 17:
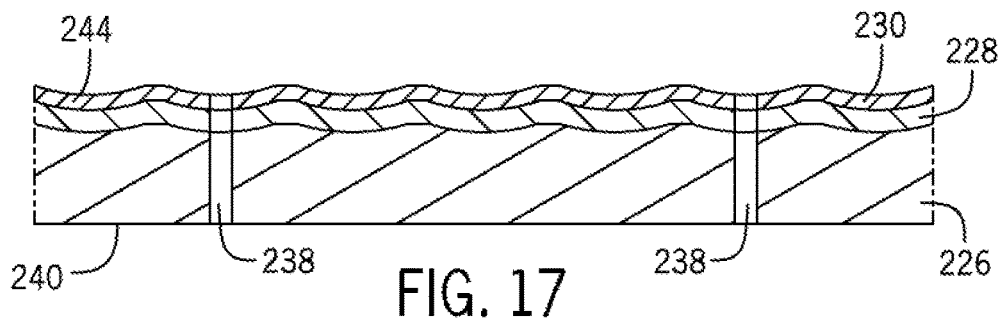
FIG. 17 is a cross sectional view of the laser cutting belt and first cutting belt taken generally along lines 17-17 of FIG. 16.

Referring to FIG. 17, a cross sectional view of the laser cutting belt is illustrated in that the upper surface of base layer 226 the TPU layer 228 and Aluminum layer 230 all have a similar dimple geometry.

Figure 18A:
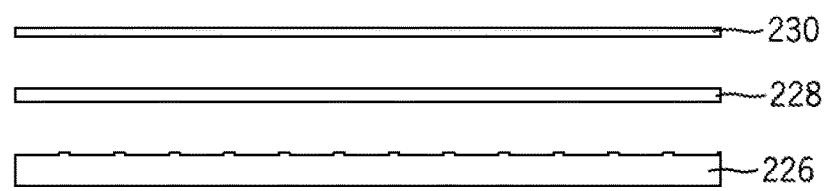
FIG. 18A is an exploded view of the laser cutting belt prior to assembly
Figure 18B:
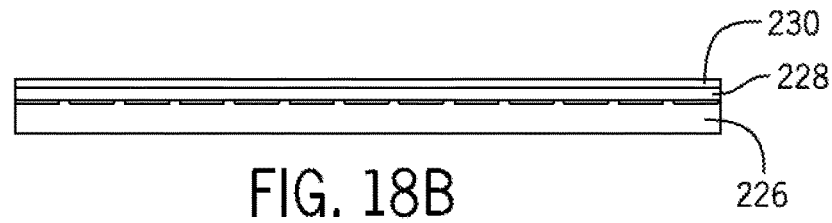
FIG. 18B is a side view of the laser cutting belt layers prior to the application of heat and pressure.
Figure 18C:
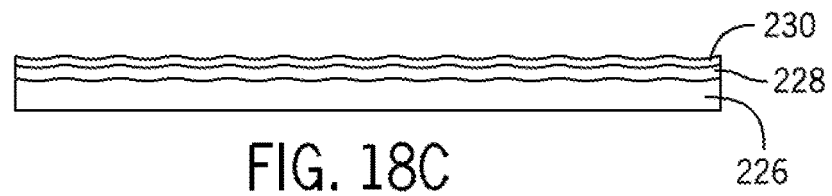
FIG. 18C is a side view of the laser cutting belt after the application of heat and pressure.
Figure 18D:
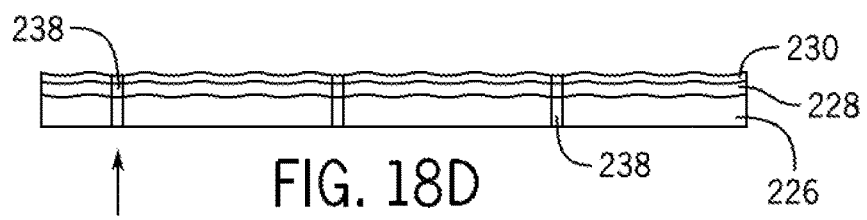
FIG. 18D is a side view of the laser cutting belt after holes are punched therethrough.

Referring to FIG. 18A, base layer 226 has a portion that has a non-smooth pattern that is transferred to the initially smooth TPU and Aluminum layers. FIG. 18A is schematic of base layer that in one embodiment has a smooth non-woven upper layer and lower layer. The dimpled pattern of the upper layer of the non-woven portion of the base layer is formed from the woven central portion of the base layer upon the application of pressure to the aluminum layer. The base layer, TPU layer and Aluminum layer are positioned on one anther is illustrated in FIG. 18B and after the application of pressure and heat panel 200 is formed with the aluminum layer being secured to the base layer by the TPU layer. In one embodiment no adhesive is used to secure the base layer TPU layer and aluminum layers together. The resultant dimpled patter is illustrated in FIG. 18C.

Referring to FIG. 16 the geometric regions 232 are schematic of the region formed by the woven central portion of the base layer. The geometric regions 234 and 236 represent the geometric dimples that are formed on the Aluminum and TPU layers of each panel 200 and panel 208.

Cutting system 110 may be used in a first mode in which only the first cutting material or first cutting belt 116 is positioned on table 112. In this mode a blade is used to cut a sheet 134 on the exposed upper surface of first cutting material belt or gray belt 116. In a second mode of operation second cutting material or laser belt 170 is added to cutting system 110. Starting with a first panel 200 a second panel 200 is attached thereto with lacing 202 by securing first portion 216 of first panel 200 with second portion 218 of second panel 200 with a rod 220. Subsequent panels 200 are added until laser belt 170 extends completely about table 112 such that the first panel and the last panel secured to the laser belt 170 are positioned on the upper surface of the first cutting material. Stated another way the first panel 200 and the last panel 200 secured to the chain of panels 200 are positioned on first cutting material such that the first panel 200 and last panel 200 are positioned a distance above the floor or support of the legs of the cutting equipment greater than the distance of the first cutting material. When the distance between the first panel 200 and the last panel 200 secured to the belt is less than the width of the panels 200 a connection panel 208 is formed to conform to the width between the first panel 200 and the last panel 200. The connection panel 208 is secured to the first panel 200 by a connector 202.

In one embodiment laser belt 170 may be constructed on a separate work surface and transferred to cutting equipment 110 by transfer equipment 114 discussed herein above. Where the transfer of laser belt 170 is positioned about first cutting material belt 116. In this manner it is possible to use a blade to cut a sheet on cutting equipment 110 by placing a sheet to be cut on first cutting material or gray belt 116 and the using a laser to cut a sheet to be cut by adding the laser belt to the cutting equipment 110. There is no need to remove the first cutting material or gray belt when the laser belt is added to the cutting equipment. When a user desires to use a blade to cut a sheet an operator will remove the laser belt 170 by disconnecting one of the lacing connectors 202 by removing a single rod 220 and removing the laser belt 170 by using transfer equipment 114. It is not necessary to remove rods 220 from each respective connector 220 in order to remove belt 170. A user may wind laser belt 170 about a roller on a transfer equipment 114 as illustrated in FIG. 13B for example. However other transfer equipment known in the art is also contemplated to remove and reattach laser belt 170 from and to table 112.

Once laser belt 170 is secured to table 112, laser belt may be moved about table 112 in the y direction by moving driven roller 212. In this manner both the first cutting material or gray belt 116 and the laser belt 170 are moved in unison. In one embodiment the friction between the bottom surface of laser belt 240 and the exposed surface 242 of first material or gray belt 116 is sufficient to move laser belt 170 with first material or laser belt 116.

Second cutting material 170 has a higher melting and burning temperature point than the first cutting material 116. The aluminum layer of the second cutting material 170 does not burn or melt when exposed to the laser that cuts a sheet positioned on exposed surface 244 of the laser belt 170. Additionally, the diameter of the through holes 238 and the open spaces in connector 202 are small enough as to minimize any damage to the first cutting material when the laser is operated to cut a sheet that is positioned on the exposed surface 244 of the laser belt 170.

Graphic sheet or material 134 may be a single sheet of material having a width and length along the x and y axis that are less than the width and length of the table 112. However, the graphic sheet or material may be a roll of material where portions of material from the roll is placed onto the first or second cutting material belts in a discrete fashion such that multiple graphic images are cut from the roll. For example a leading portion of a roll of material may be placed on the exposed surface of the first cutting material or second cutting material and a cutting knife or laser cuts a portion of the leading portion of the roll. The roll then may index along the y axis and a subsequent cutting operation may be conducted on a second portion of the roll to cut a second graphic image from the roll. This may be repeated as graphic images are cut all along the roll as portions of the roll on placed onto the first or second cutting materials.

While laser belt 170 can be used in a dual belt mode in which laser belt 170 is placed over the gray belt 116 it is also contemplated that laser belt 170 may be used on a cutting machine independently of the gray belt 116. Accordingly, laser belt 170 as described herein may be driven along the y axis directly by a drive roller or by other drive means.

Figure 20:
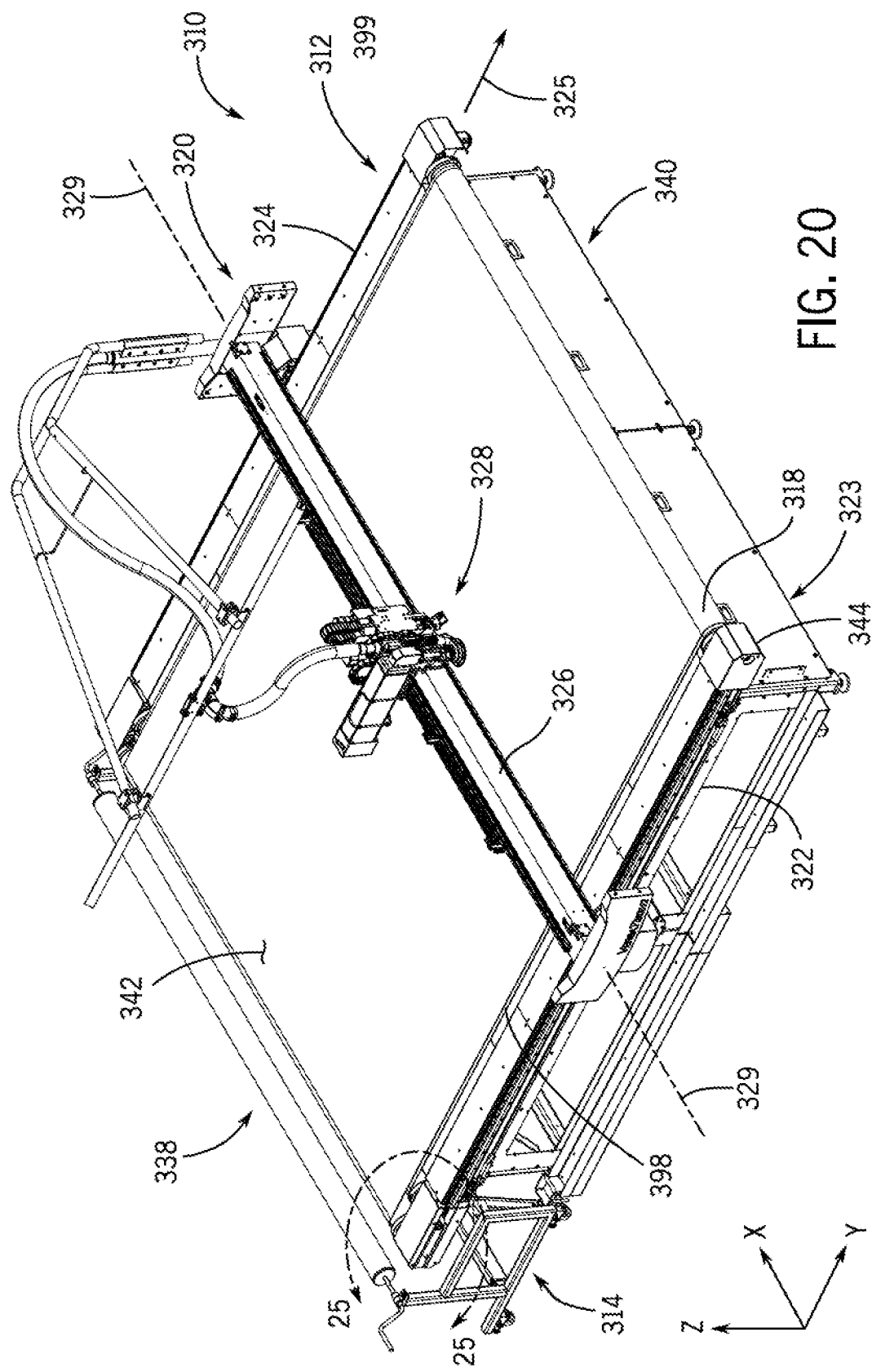
FIG. 20 is an embodiment of a cutting system.
Figure 25:
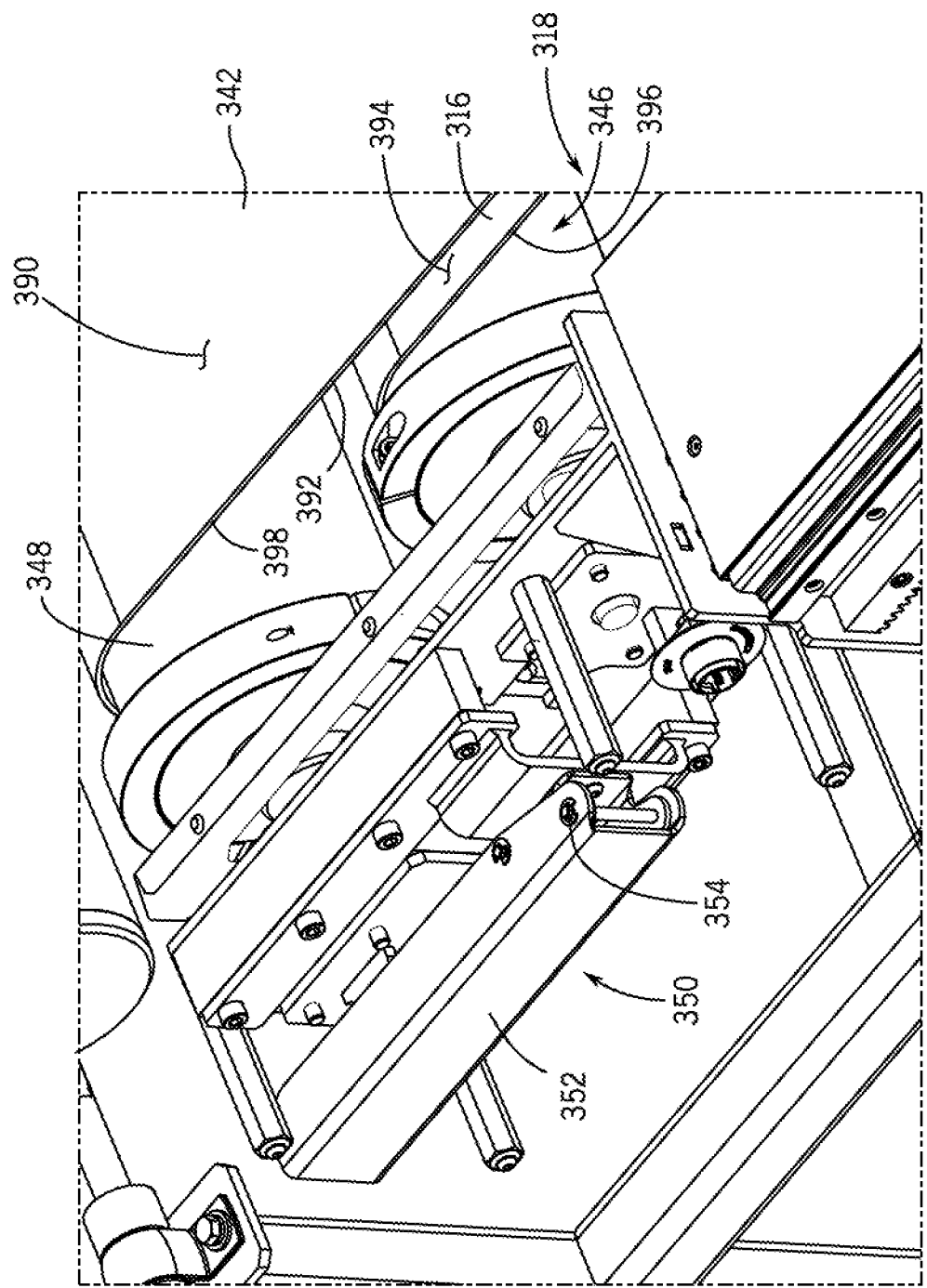
FIG. 25 is a close up of the tensioner system of the dual idler roller system of FIG. 20.
Figure 26:
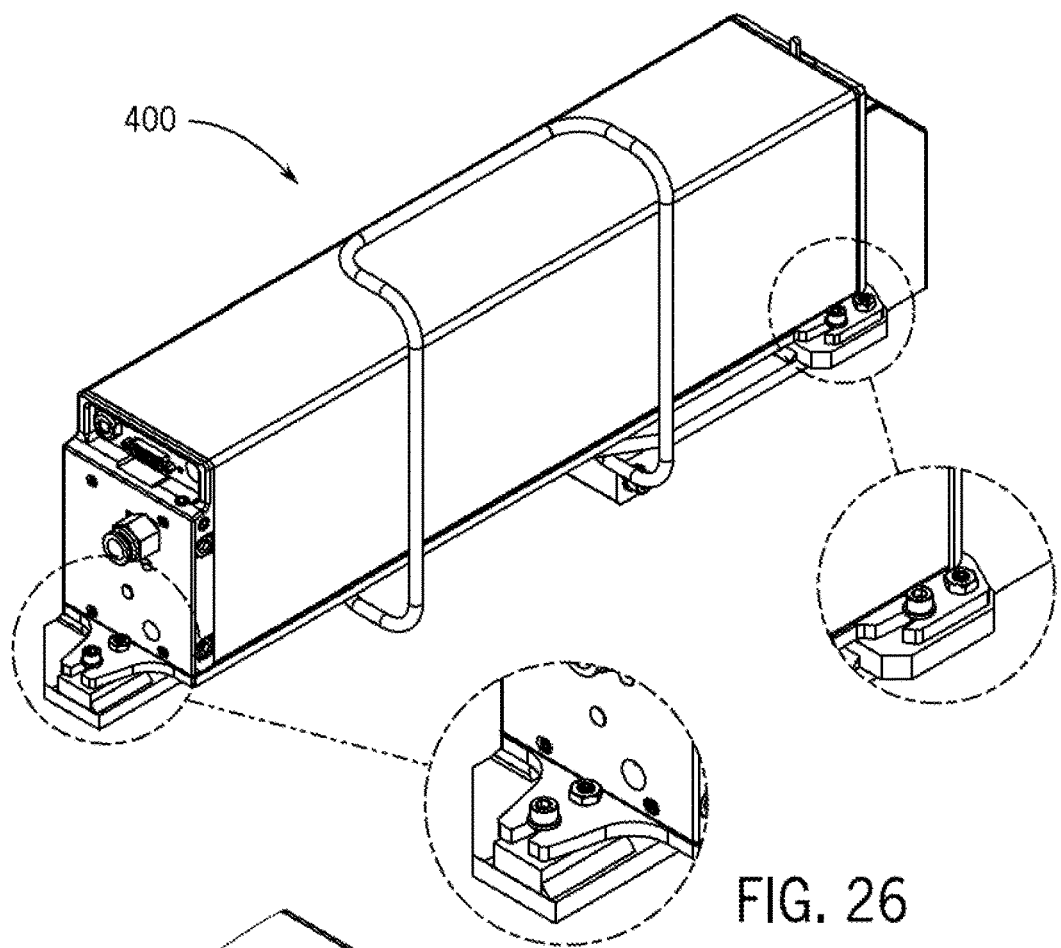
FIG. 26 is a view of the laser tube.

Referring to FIG. 20 and FIG. 25, a cutting system 310 includes a cutting table 312 and laser cutting surface transfer station 314. Cutting table 312 includes a first cutting material belt 316 and a first conveyor drive system 318 including a drive motor, a driven roller 344 and an idler roller 346. Cutting table 312 further includes a cutter system 320 including a pair of side rails 322, 324 and a horizontal rail 326 supporting a cutter 328. Horizontal rail 326 has a longitudinal axis 329 that extends generally perpendicular to the longitudinal axes of the side rails. Horizontal rail 326 is movable between a first portion 338 and a second portion 340 of table 312. The longitudinal axis 329 of the horizontal rail 326 extends perpendicular to the longitudinal axes 323 and 325 of the side rails 322, 324. Stated another way the longitudinal axis 329 of the horizontal rail 326 extends along or parallel to the x axis as illustrated in FIG. 20 and the longitudinal axes 323 and 325 extend along or parallel to the Y-axis as illustrated in FIG. 20.

A second belt 342 having a laser cutting surface extends over and about first belt 316. In one embodiment second belt 342 is removably placed about first belt 316 via laser cutting surface transfer station 314. In one embodiment, second belt 342 is driven solely frictional engagement to the first belt 316. First belt 316 extends over and around a roller 344 which is driven by a motor and an idler second roller 346. First roller 344 is driven by a motor (not shown) while second roller 346 is an idler roller that freely rotates. First roller is proximate second portion 340 while second roller is first portion 338. A first tensioner is operatively connected to second roller 346 to provide proper tension of first belt 316 when first belt is placed around both first roller 344 and second roller 346. First belt forms a continuous belt around the first roller 344 and the second roller 346. Second belt 342 is placed over first belt 316 such that first belt also goes about first roller 344 albeit over first belt 316 proximate portion 340. Stated another way first belt 316 is positioned between first roller 344 and the second belt 342. However, second belt 342 goes about a third roller 348 proximate portion 338 such that second belt 342 is in direct contact with third roller 348. Third roller 348 being further from first roller 344 than second roller 346. A second tensioner 350 operatively provides tension to second belt 316 by the movement of a lever or handle 352 about pivot 354.

Having only one driven conveyer roller 344 in the back or portion 340 and no driven rollers in the front or portion 338 improves belt tracking and increases friction between the first or grey belt 316 and the second or laser belt 342. Stated another way there are two rollers (one driven 344 and one idler 346) that supports and moves the first or grey blade cutting belt 316 along back and forth along the y-axis. In addition, a third roller 348 in which the laser belt 342 wraps around assists in tracking of the laser belt 342 with the grey belt 316. The use of a single roller to move both the first grey belt 316 and the second laser belt 342 on one end of the table and the use of two separate rollers on the other distal end of the table for the grey belt 316 and the laser belt 342 respectively provides for improved tracking of the belts with respect to roller 318. First cutting grey belt 316 and/or second laser belt 342 may be formed of any of the embodiments as described herein with respect to all of the belts described herein.

Figure 21:
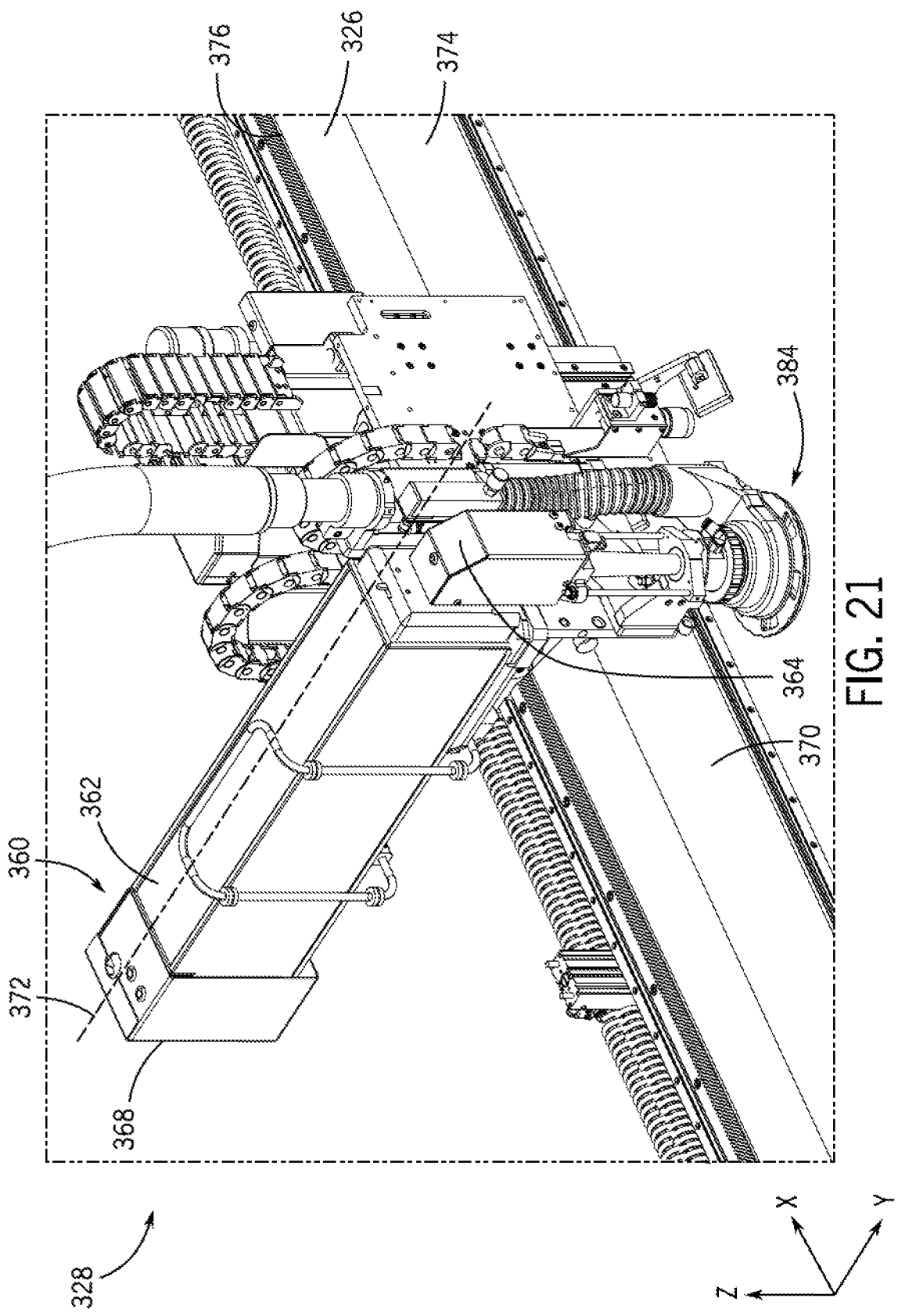
FIG. 21 is a close up of the cutting head of the system of FIG. 20.

Referring to FIG. 21, cutting station 328 includes a removably attached laser cutter 360 having a first portion 362 and a second portion 364. First portion 362 includes a housing 364 holding a laser tube that generates a laser beam. Second portion 364 is removably connected to housing 364 and includes a laser beam bender assembly 366. Housing 364 has a first end 368 and a second end 370. Housing 364 has a longitudinal axis 372 that is substantially parallel to the Y-axis of table 312 as illustrated in FIG. 20. Note that the first portion 362 has a length dimension along the Y-axis that is substantially greater than the dimension along the X-axis ad the Z-axis. The longitudinal axis of the 372 extends substantially perpendicular to the longitudinal axis of the horizontal rail 326. Portion 370 extends beyond a rear face 374 of the horizontal rail 326. Stated another way the portion 370 of the first portion 362 of the laser cutter is closer to portion 340 of the cutter table than the rear face 374 of the horizontal rail. For further clarification the rear race 374 of the horizontal rail is define as the region of the horizontal rail that extends between the first rail and the second rail 322, 324 that is directly over the first cutting belt 316. First end 368 is closer to portion 338 of table 312 than a front surface 376 of horizontal rail 326.

Figure 22:
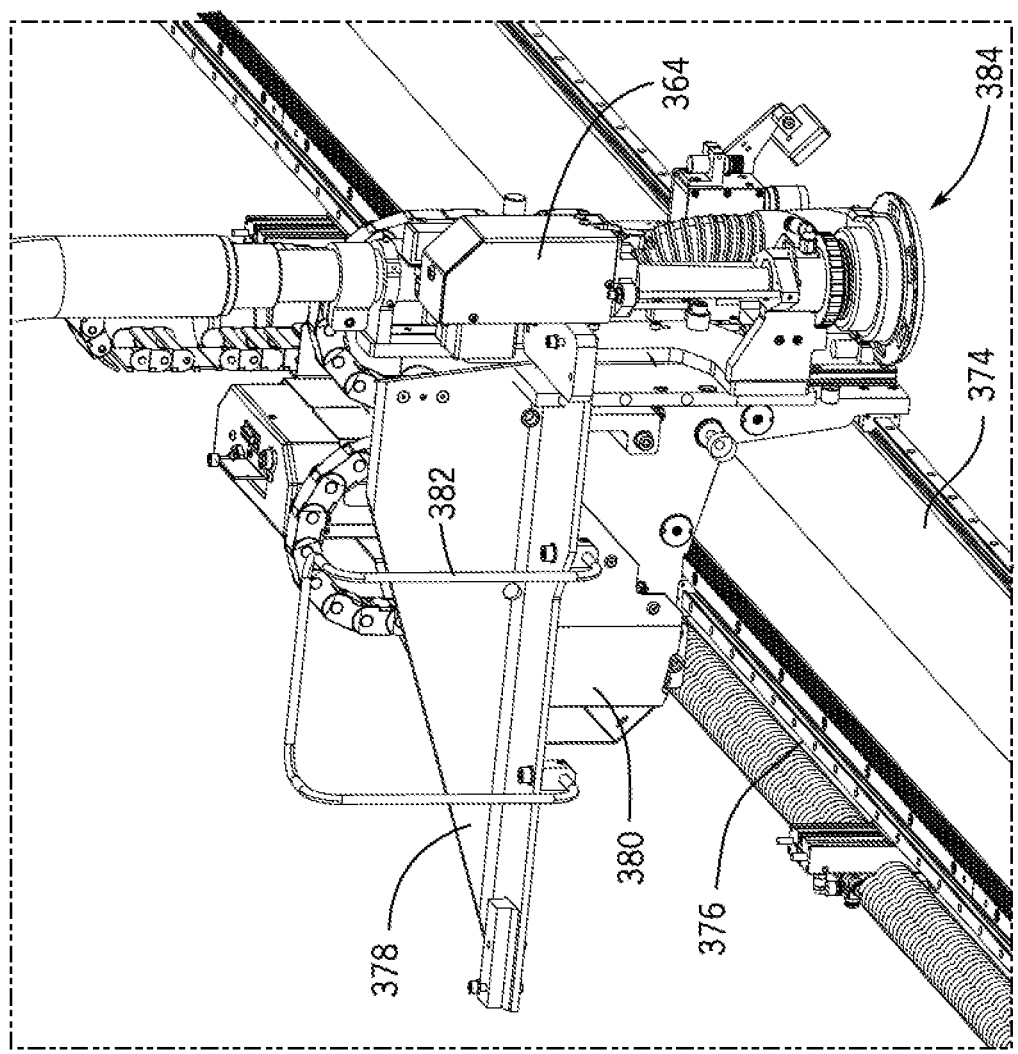
FIG. 22 is a close up of the laser bracket of FIG. 21.
Figure 23:
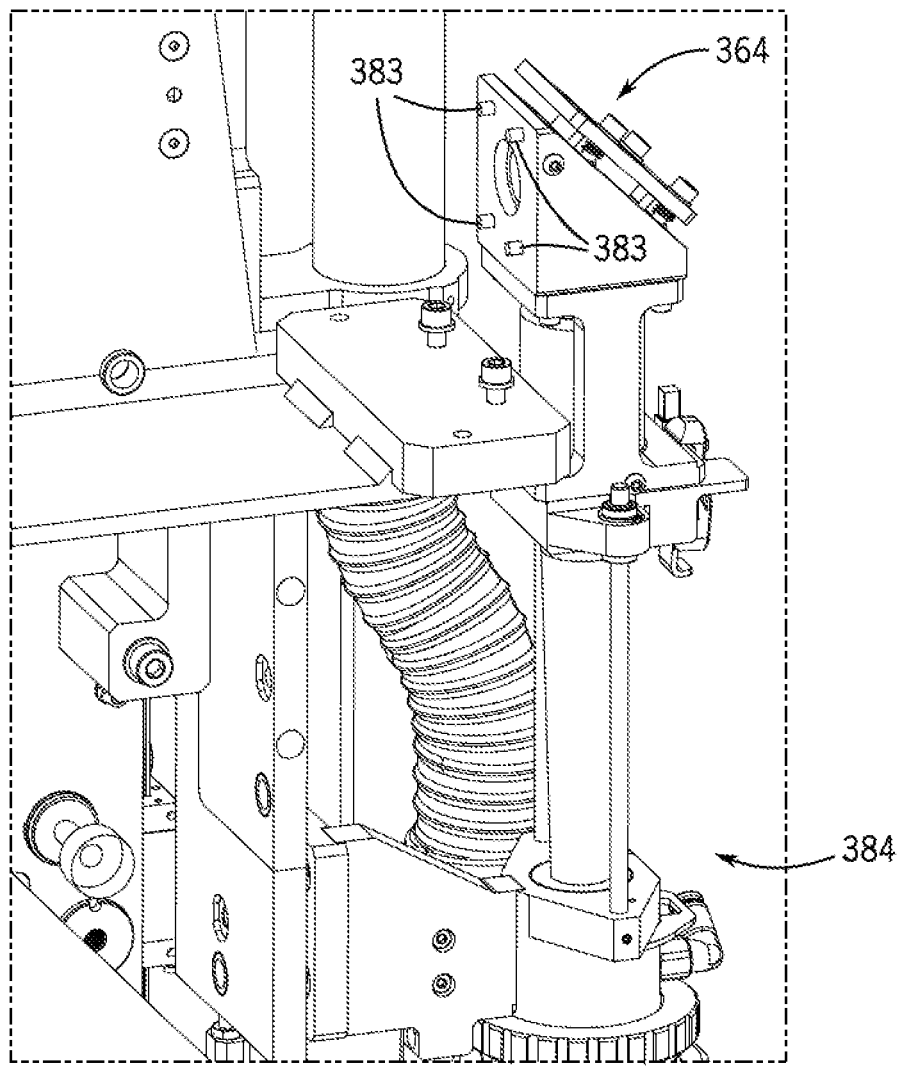
FIG. 23 is an isometric view of the laser beam bender assembly of FIG. 21.
Figure 24:
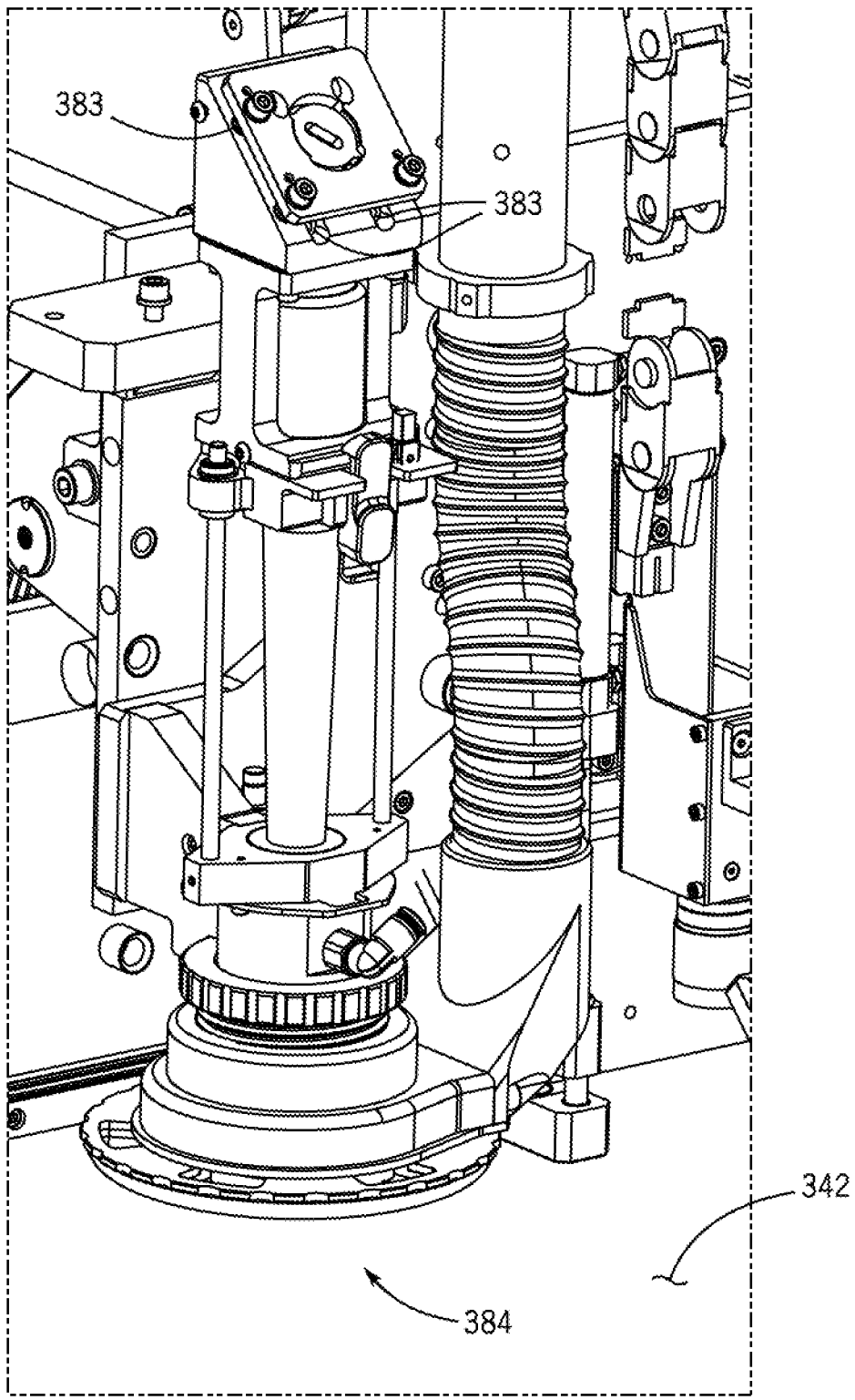
FIG. 24 is an isometric view of the laser expander of FIG. 21.
Figure 28:
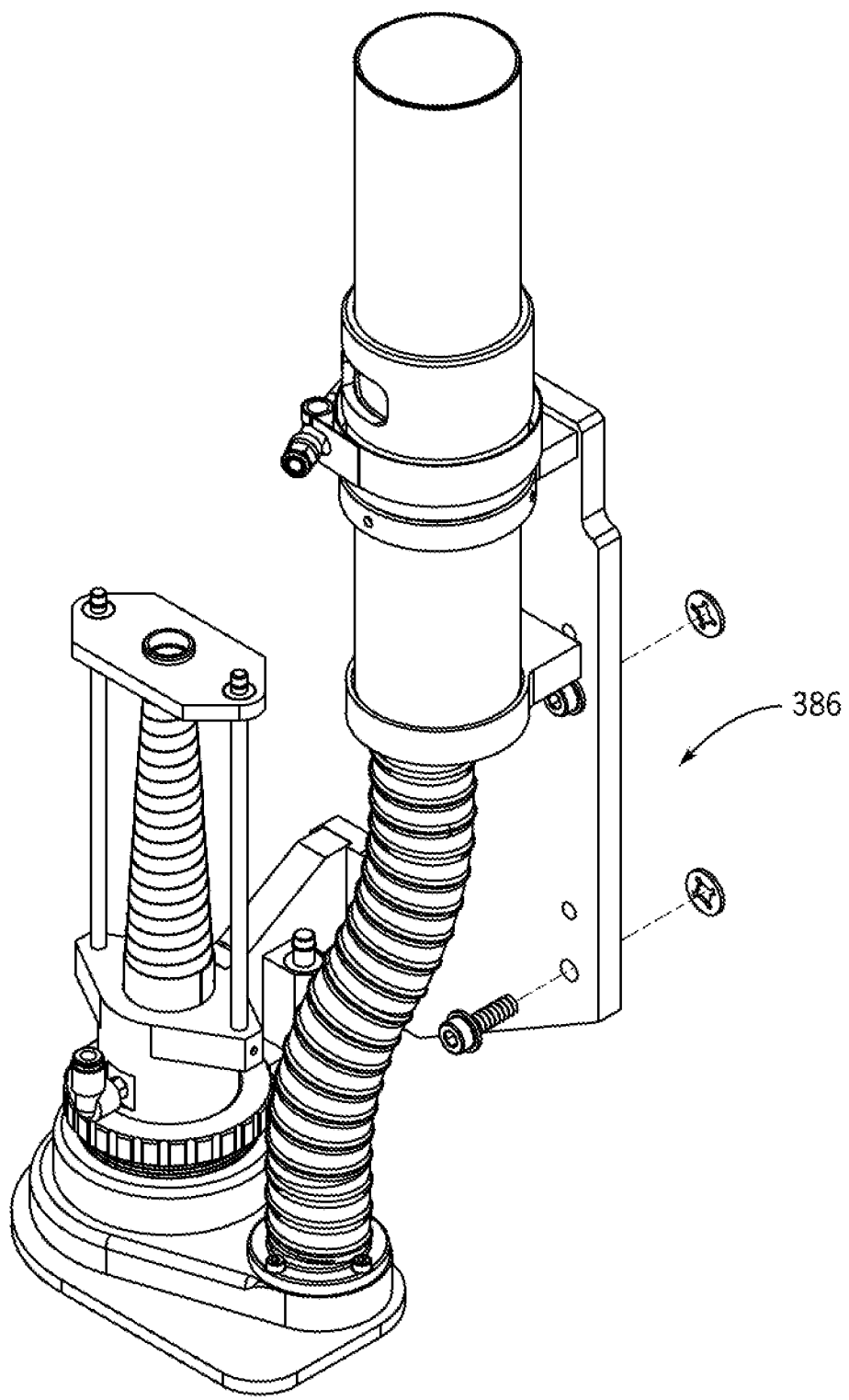
FIG. 28 is the laser lens holder and expansion assembly.

Referring to FIG. 22, a laser bracket 378 is operatively coupled to the cutter housing 380. First portion 362 of the laser assembly is secured to bracket 378. A handle 382 allows a user to remove bracket 378 from cutter housing 380. Referring to FIGS. 23, 24 and 28, second portion 364 is coupled to first portion 362 via bolts 382. A laser lens holder 384 is secured to cutter housing 380 via a bracket 386. While second portion 364 is coupled to and stationary with respect to first portion 362 laser lends holder 384 moves toward and away from first grey belt and second laser belt in the z-axis direction.

Figure 27:
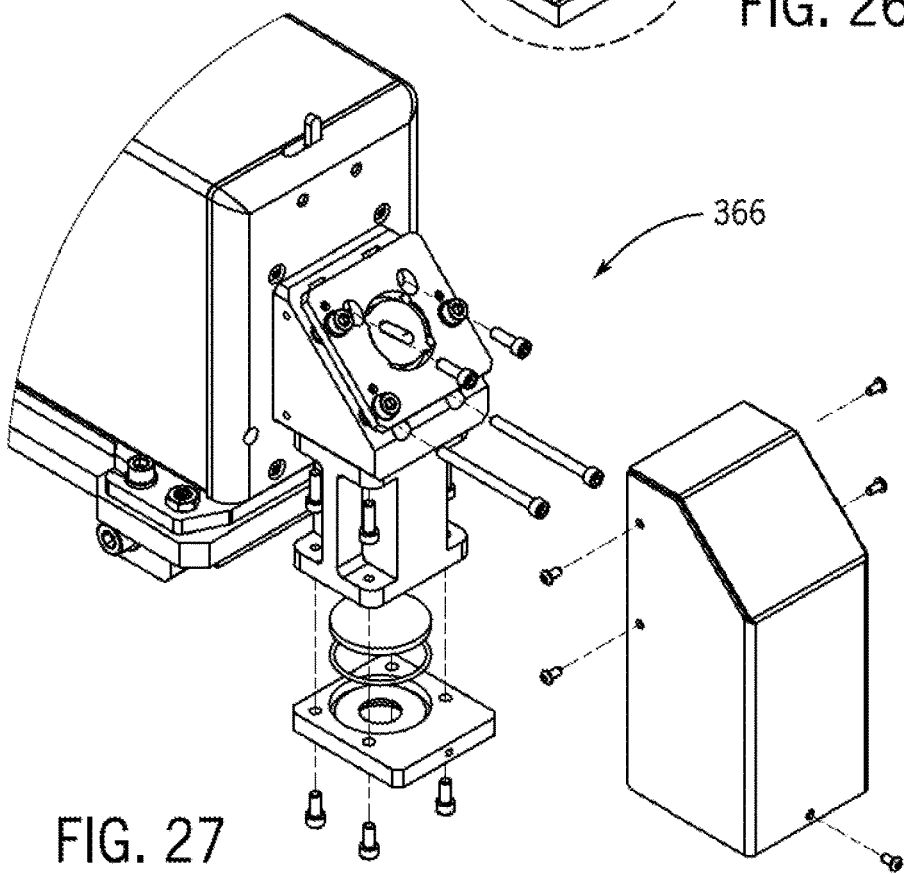
FIG. 27 is an exploded view of the laser beam bender assembly.

Laser device 360 is formed as a two-part assembly. First portion 362 houses a laser tube provides a laser exiting the first portion 362 immediately adjacent to the second portion 364. The laser beam exits first portion 362 in the y-axis direction and enters into laser lens holder of the second portion 364 which changes the direction of the laser beam from traveling along the Y-axis to along the Z-axis in a direction toward the first grey belt 316 and the second laser belt 318. A collimator is positioned within the second portion to adjust the diameter of the laser beam that impacts the surface of the item to be cut that is resting on the second laser belt 318. The assembly of the laser beam bender assembly and the laser lens holder assembly are illustrated in FIG. 27 and FIG. 28 respectively. It is believed that the collimator provides enhanced stability of the laser beam diameter for cutting purposes.

First belt 316 may be formed from a self-healing material such as felt with or without appropriate backing material. Other self-healing materials known in the art may also be used. First belt 316 in one embodiment extends over a top portion of cutting table 312 extending over a roller 344, under a portion of the cutting table 312 and over roller 346. In this manner, a cutting surface forms a continuous surface that may be moved about the table in a continuous manner. This continuous feature allows very long rolls or sheets longer than the cutting machine of materials to be moved fore and aft relative to cutting table 312 and then moved from a first front portion 338 toward a second portion 340 and then off to a storing location that is off of cutting table 312 in a vector direction from first portion 338 toward second portion 340.

Second laser belt 342 may be formed as discussed with respect to other embodiments herein above or as further described herein below. Second laser belt 342 has a first surface 390 and an opposing second surface 392. The second surface 392 is immediately adjacent a first surface 394 of belt 316, while a second surface 396 that is opposite to first surface 394 of belt 316 contacts rollers 344 and 346. Second surface 392 of laser second belt 390 contacts first surface 394 of the first belt 316. Second surface 392 does not contact the majority of first roller 344 directly. Although it is contemplated that a portion of second belt 390 at its terminal edges 398, 399 may contact roller 344 directly. Second laser belt 342 does however directly contact roller 348. Second laser belt 342 is driven about table 312 by a friction contact of the first belt 316 and the second belt 342 by driven roller 344. Proper tension is provided between the two belts by adjusting the tension individually and separately of the first grey belt 316 and the second laser belt 348 by adjustment of rollers 346 and 348 along the Y-axis respectively.

Figure 32:
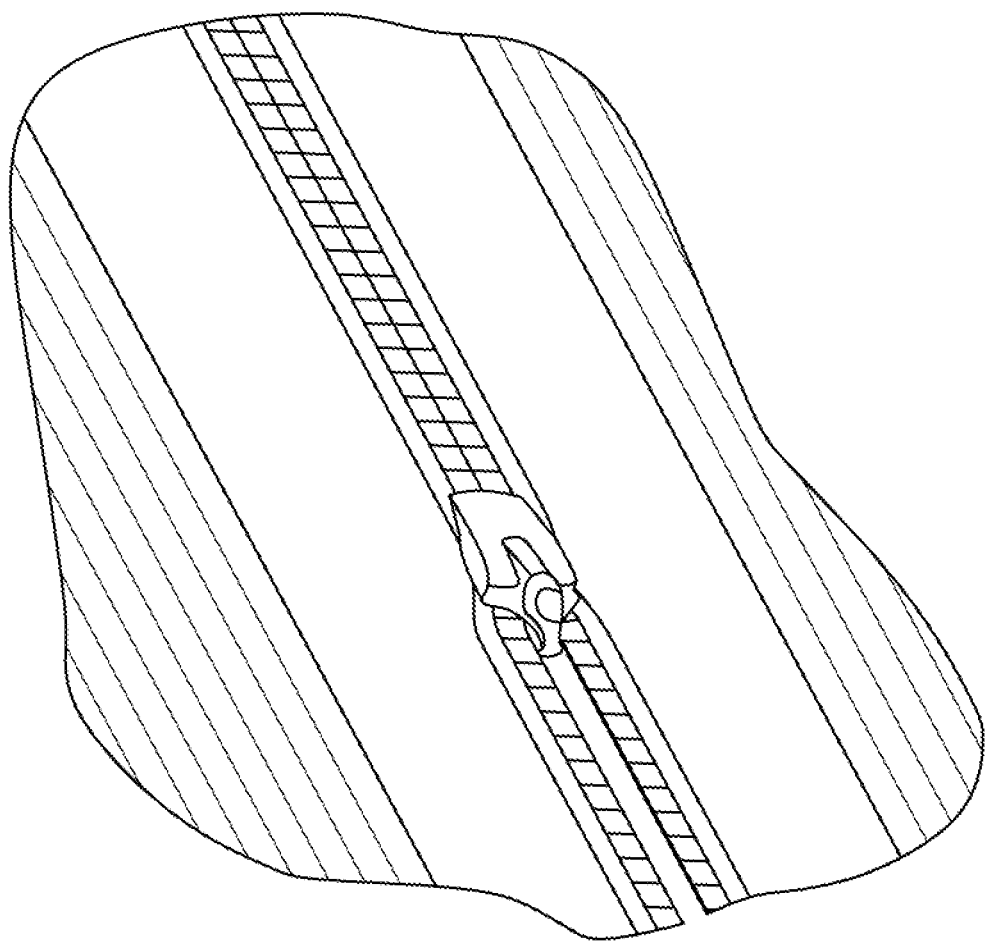
FIG. 32 is a view of a zipper connector for the laser belt.

Referring to FIG. 32 in one embodiment laser belt 342 is formed from a plurality of panels that are connected together as described above herein. Two of the panels however may be connected to one another by an industrial metal zipper. One of the panels may be shorter than the rest in the Y-axis direction to aid in the connection of the two terminal ends of the belt to form a continuous loop of material. In one embodiment belt 342 is made up of a plurality of panels having a distance of 43 inches along the y-axis when the panel is fully parallel to the x-y plane. The short connection panel having one portion of the zipper assembly has a distance of 24 inches along the y-axis when the short connection panel is in fully parallel to the x-y plane. Other panel lengths are contemplated. In one embodiment the panels have substantially the same dimension in the x-axis y-axis directions with one connection panel being different than the others in the y-axis direction. In one embodiment the connection panel is shorter than the other panels and in one embodiment the connection panel is longer than the other panels. It another embodiment all of the panels would be of equal dimensions. The connection panel may have a leading edge with one half of the zipper assembly that is zipped tougher to a trailing edge of another panel that includes the other half of the zipper assembly. The respective zipper halves may be sewn into the respective edges of the connector panel and other panel.

In one embodiment the zipper is heavy duty and constructed to support a load of 100 lbs per inch. The rest of the connectors for the other panels use metal belt lacing as described herein above.

After assembly of the zipper, a user adds a layer of 2 mil×2 in 3 M pressure sensitive aluminum tape (disposable) which protects the zipper and the sewing (stitches) from getting cut apart by the laser. The tape is simply pulled off and disposed when laser belt is being removed. Other high temperature resistant tapes known in the art that will not burn for a standard laser beam known in the cutting art may also be used.

Figure 29:
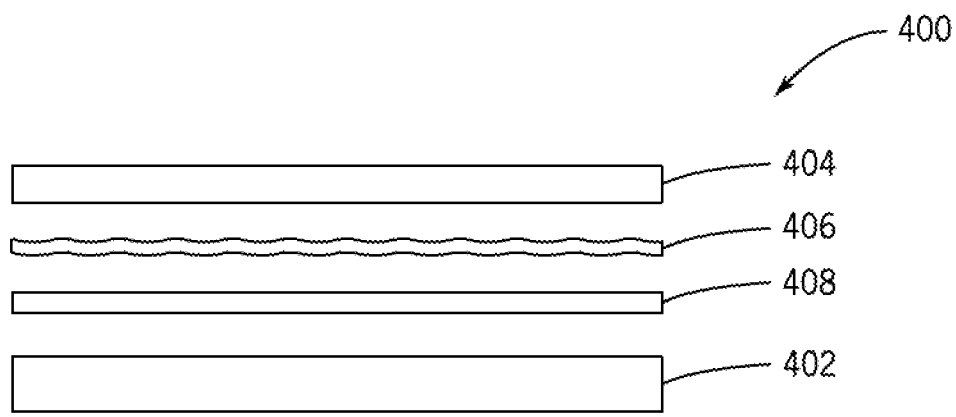
FIG. 29 is a cross sectional exploded view of a laser cutting belt.
Figure 30:
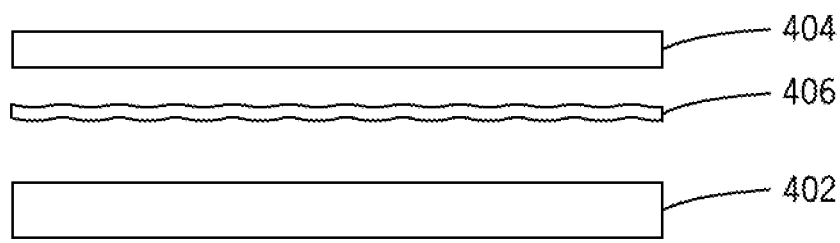
FIG. 30 is a cross sectional exploded view of a laser cutting belt.

Referring to FIG. 29 and FIG. 30 the construction of the plurality of the panels that form laser belt 342 includes in one embodiment a carrier or base layer 402 and an aluminum layer 404 operatively connected to the base layer via an adhesive 406 that is applied to the Aluminum layer 404 prior to adhesion to the base layer 402. In this manner the adhesive 406 is positioned between the aluminum layer 404 and the base layer 402. In another embodiment a layer of TPU material 408 is located between the base layer 402 and the aluminum layer 404 as described herein above. An adhesive material 406 may be applied to the TPU 408 material and/or the aluminum material 404 to increase the adhesion of the aluminum material 404 to the TPU material 406.

In one embodiment the adhesive 406 applied either directly between the base layer 402 and the aluminum layer 404 or between the TPU layer 408 and the aluminum layer 404 is sprayed onto the side of the aluminum layer 404 that faces the TPU 406 and/or base layer 402 in a liquid form prior to adhering the aluminum material 404 to the TPU layer 408 or the base layer 402. The types of materials and thickness of the materials are as discussed hereinabove.

Figure 31:
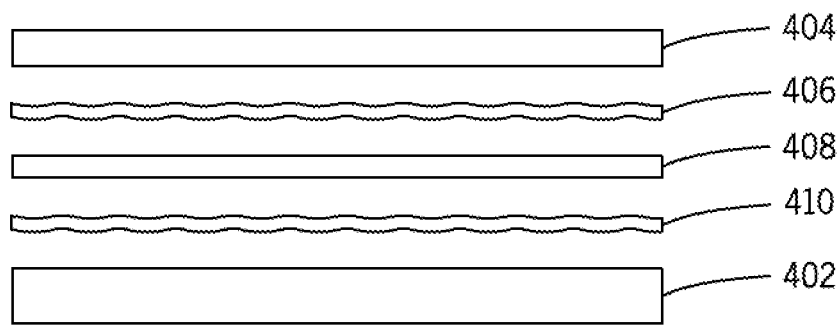
FIG. 31 is a cross sectional exploded view of a laser cutting belt.

Referring to FIG. 31 in one embodiment a second layer of adhesive is applied between the base layer 402 and the TPU layer 408 in addition to the first layer 406 between the aluminum layer and the TPU layer.

The adhesive provides a peel strength of at least 5 lbs/in—when measured using ASTM peel strength tests. Once such test includes moving the belt about a pair of rollers roller having a diameter of 4 inches for 5000 cycles. Other roller diameter and cycles are also contemplated.

In one embodiment in which the adhesive 406 is applied directly to the TPU 408. The adhesive 406 is used to improve the bond strength between the TPU film 408 and the Aluminum foil 404 has an aqueous based heat sealing agent. The adhesive agent is applied onto Aluminum surface in wet state and run through hot air oven to evaporate moisture. It is believed that the adhesive application assists in lowering the surface energy at the metal interface and thus improve bond strength with TPU film in laminate.

In one embodiment longitudinal edges 398 and 399 of the laser belt 342 are covered with a fabric style tape to provide additional strength to the edges and to minimize peeling of the aluminum layer from the TPU and/or base layer.

In one embodiment a plurality of holes are punches through the panels as discussed herein above. In one embodiment the holes punches form a random pattern to minimize the number of holes that fall in a single line that is parallel to the x-axis. By minimizing he number of through holes that are in a single line cracking and/or delamination of the aluminum layer adjacent the holes is minimized in contrast to the hole pattern in which all of the holes are positioned in evenly spaced parallel lines.

In one embodiment a cutting apparatus comprises a cutting table and a laser belt movably supported about the cutting table about a first roller and a second roller, the laser belt movable along a direction of travel extending perpendicular to the first roller and the second roller. A horizontal rail extends across the cutting table substantially between and parallel to a longitudinal axis of the first roller and second roller. A laser assembly includes a first portion having a laser tube operatively secured to the horizontal rail and a second portion operatively secured to the first portion, the second portion including a laser beam bender assembly. The first portion of the laser assembly includes a housing having a longitudinal axis parallel to the direction of travel of the laser belt.

In one embodiment the cutting apparatus the second portion of the laser assembly bends a laser beam generated from the first portion from a horizontal direction to a vertical direction toward the laser belt.

In one embodiment the cutting apparatus further includes a cutting station movably supported along the horizontal rail, the cutting station including a bracket, the first portion of the laser assembly being coupled to the bracket.

In one embodiment the cutting apparatus further including a handle operatively secured to the bracket.

In one embodiment the cutting apparatus further including a handle operatively secured to the first portion of the laser assembly.

In one embodiment the handle, bracket and first portion of the laser assembly are removed together from the cutting station.

In one embodiment a bracket is operatively secured to the horizontal rail and the housing of the first portion of the laser assembly being removably secured to the bracket.

In one embodiment the housing includes a first end and a second end, the first end extending beyond a rear face of the horizontal rail and the second end extending beyond a front face of the horizontal rail.

In one embodiment the second portion of the laser assembly is removably connected to the first portion of the laser assembly.

In one embodiment the second portion of the laser assembly includes a collimator adjusting the diameter of the laser beam that impacts the surface of an item to be cut that is resting on the laser belt.

In one embodiment a first material belt is movable about the cutting table between the table and the laser belt in the same direction of travel as the laser belt.

In one embodiment a cutting station operatively is movably supported on the horizontal rail, the cutting station includes a bracket and the laser assembly being removably coupled to the bracket.

In one embodiment a longitudinal axis of the second portion is substantially perpendicular to a longitudinal axis of the first portion.

In one embodiment the cutting apparatus further includes a laser lens holder operatively coupled to the second portion, the laser lens holder operatively supported to the cutter housing via a laser lens holder bracket.

In one embodiment the cutter apparatus further includes an exhaust system supported by the laser lens holder bracket.

In one embodiment a cutting apparatus comprises a cutting table and a laser belt movably supported about the cutting table about a first roller and a second roller, the laser belt movable along a direction of travel extending perpendicular to the first roller and the second roller. A horizontal rail extends across the cutting table substantially between and parallel to a longitudinal axis of the first roller and second roller. A laser assembly includes a first portion having a laser tube operatively secured to the horizontal rail and a second portion operatively secured to the first portion, the second portion including a laser beam bender assembly. The bracket is movable along the horizontal rail. The bracket being removable from the horizontal rail while coupled to the at least the first portion of the laser assembly.

In one embodiment the cutting apparatus includes a cutting station movable along a longitudinal axis of horizontal rail, the bracket being removably coupled to the cutting station.

In one embodiment the cutting apparatus further includes a laser lens holder and an exhaust system.

In one embodiment the laser lens holder is removably coupled to second portion of the laser assembly.

In one embodiment the laser lens holder is operatively coupled to the cutting station with a laser lens holder bracket.

In one embodiment a cutting apparatus comprises a cutting table and a laser belt movably supported about the cutting table about a first roller and a second roller. A horizontal rail extends across the cutting table. A laser assembly includes a first portion having a laser tube operatively secured to the horizontal rail and a second portion operatively secured to the first portion, the second portion including a laser beam bender assembly.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. It is also contemplated that the features described herein may be combined in different combinations then described in the specific embodiments illustrated and/or described.

What is claimed is:

1. A fabric cutting apparatus comprising:
   a cutting table;
   a first cutting material belt movably supported about the cutting table between a first roller and a second roller attached to the cutting table;
   a second cutting material belt removably supported above the first cutting material belt between the first roller and a third roller attached to the cutting table, wherein the second roller is intermediate and coplanar with the first roller and the third roller;
   wherein the second cutting material belt includes a metal material having a plurality of apertures extending therethrough;
   a blade cutter having a blade configured to cut first fabric;
   a laser assembly including a first portion having a laser tube operatively secured to a horizontal rail and a second portion operatively secured to the first portion, the second portion including a laser beam bender assembly for directing a laser beam from the laser assembly to the second cutting material belt to cut second fabric; and
   a vacuum system for drawing air through the plurality of apertures to hold the fabric to the second cutting material belt and remove fumes generated during laser cutting of the second fabric, and
   wherein the second cutting material belt is formed as a continuous loop and includes at least one zipper connector to undo the loop for selectively removing the second cutting material belt from the first material cutting belt to allow for the blade to cut the first fabric on the first cutting material belt.

2. The apparatus of claim 1, wherein the first roller is driven by a motor and the second roller and third rollers are idler rollers.

3. The apparatus of claim 1, wherein to form the second cutting material belt, aluminum is secured to a carrier layer formed of a nonmetal material with an adhesive of an intermediate thermal plastic polyurethane layer.

4. The apparatus of claim 1 wherein the apertures are not all aligned in parallel evenly spaced lines.

5. The cutting apparatus of claim 1, wherein a laser belt is movable along a direction of travel extending perpendicular to the first roller and the second roller, the horizontal rail extends across the cutting table substantially between and parallel to a longitudinal axis of the first roller and second roller, and wherein the first portion of the laser assembly includes a housing having a longitudinal axis parallel to the direction of travel of the laser belt.

6. The cutting apparatus of claim 1, wherein the second portion of the laser assembly bends a laser beam generated from the first portion from a horizontal direction to a vertical direction toward a laser belt.

7. The cutting apparatus of claim 1, wherein the first portion of the laser assembly comprises a housing, the cutting apparatus further including a bracket operatively secured to the horizontal rail and the housing of the first portion of the laser assembly being removably secured to the bracket.

8. The cutting apparatus of claim 1, wherein the first portion of the laser assembly comprises a housing, and wherein the housing includes a first end and a second end extending from a rear face of the horizontal rail to a front face of the horizontal rail.

9. The cutting apparatus of claim 1, wherein the second portion of the laser assembly is removably connected to the first portion of the laser assembly, and optionally, a longitudinal axis of the second portion is substantially perpendicular to a longitudinal axis of the first portion.

10. The cutting apparatus of claim 1, wherein the second portion of the laser assembly includes a collimator adjusting a diameter of the laser beam that impacts a surface of an item to be cut that is resting on a laser belt.

11. The cutting apparatus of claim 1, further including a laser lens holder operatively coupled to the second portion, the laser lens holder operatively supported to the cutter housing via a laser lens holder bracket, further including an exhaust system supported by the laser lens holder bracket.

12. The cutting apparatus of claim 1, further including at least one of a cutting station and a bracket, movable along a horizontal rail, wherein:
   the cutting station includes the bracket, and the laser assembly is removably coupled to the bracket; and
   the bracket is either removable from the horizontal rail while coupled to the at least the first portion of the laser assembly or removably coupled to the cutting station.

13. The cutting apparatus of claim 11, wherein the laser lens holder is removably coupled to second portion of the laser assembly; and wherein the laser lens holder is operatively coupled to the cutting station with a laser lens holder bracket.

14. The cutting apparatus of claim 1, wherein the second cutting material belt forms a plurality of dimples to dissipate energy of the laser beam and each the plurality of apertures is centered in one of the plurality of dimples.

15. The cutting apparatus of claim 14, wherein the second cutting material belt is formed from a woven base layer having a non-smooth pattern, an intermediate TPU layer and an aluminum layer configured to be joined together without adhesive by heat and pressure that transfers the non-smooth pattern to the aluminum layer.

16. The cutting apparatus of claim 1, wherein the second cutting material belt has a bending radius to form to the first, second and third rollers without forming a wrinkle.

17. The cutting apparatus of claim 1, further comprising high temperature resistant tape removably applied to the at least one zipper for protecting the at least one zipper.

18. The cutting apparatus of claim 1, wherein the second material cutting belt is a plurality of panels connected with metal belt lacing and the at least one zipper is a plurality of zippers, each zipper covered by the high temperature resistant tape.

19. A fabric cutting apparatus comprising:
   a cutting table assembly having a blade cutter assembly and a laser cutter assembly;
   a first cutting material belt movably supported about the cutting table between a first roller and a second roller attached to the cutting table, the first cutting material belt being configured to hold fabric for cutting by the blade cutter assembly;
   a second cutting material belt removably supported above the first cutting material belt between the first roller and a third roller attached to the cutting table, the second cutting material belt being configured to hold fabric for cutting by the laser assembly, wherein the second cutting material belt includes a zipper with a first half on a leading edge and a second half on a trailing edge so that the first and second halves can be joined to form a continuous loop and separated for removing the second material cutting belt from above the first cutting material belt, wherein the second cutting material belt defines a plurality of apertures extending there-through configured to have vacuum applied to the apertures for retaining fabric to the second cutting material belt, wherein the second roller is intermediate and coplanar with the first roller and the third roller.

20. A fabric cutting apparatus comprising:
a cutting table assembly having a blade cutter assembly and a laser cutter assembly;
a first cutting material belt movably supported about the cutting table between a first roller and a second roller attached to the cutting table, the first cutting material belt being configured to hold fabric for cutting by the blade cutter assembly;
a second cutting material belt removably supported above the first cutting material belt between the first roller and a third roller attached to the cutting table, the second cutting material belt being configured to hold fabric for cutting by the laser assembly.

* * * * *